(12) United States Patent
Hu et al.

(10) Patent No.: US 12,732,835 B2
(45) Date of Patent: Sep. 8, 2026

(54) MULTI-CONNECTIVITY COMMUNICATION METHOD AND APPARATUS

(71) Applicant: Huawei Technologies Co., Ltd., Shenzhen (CN)

(72) Inventors: Xingxing Hu, Shanghai (CN); Tingting Geng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 18/400,712

(22) Filed: Dec. 29, 2023

(65) Prior Publication Data

US 2024/0137786 A1 Apr. 25, 2024
US 2024/0236719 A9 Jul. 11, 2024

Related U.S. Application Data

(63) Continuation of application No. PCT/CN2022/099583, filed on Jun. 17, 2022.

(30) Foreign Application Priority Data

Jul. 1, 2021 (CN) ........................ 202110744528.X

(51) Int. Cl.
*H04W 24/04* (2009.01)
*H04W 40/12* (2009.01)

(52) U.S. Cl.
CPC .......... *H04W 24/04* (2013.01); *H04W 40/12* (2013.01)

(58) Field of Classification Search
CPC ..... H04W 24/04; H04W 24/08; H04W 40/12; H04W 76/15; H04W 76/19; H04W 92/20
See application file for complete search history.

(56) References Cited

U.S. PATENT DOCUMENTS

2019/0082334 A1* 3/2019 Nagaraja ............... H04W 24/04
2021/0112617 A1* 4/2021 Zhang ................... H04W 76/15
2022/0394583 A1* 12/2022 Deenoo ................. H04W 76/20
2023/0116823 A1* 4/2023 Yang ..................... H04W 24/04 370/216
2023/0397297 A1* 12/2023 Zhang ................... H04W 76/15
2024/0298370 A1* 9/2024 Freda .................... H04W 40/22
2026/0032546 A1* 1/2026 Belleschi ............ H04W 36/305

FOREIGN PATENT DOCUMENTS

CN 110798903 A 2/2020
CN 112512112 A 3/2021
EP 4114126 A1 1/2023
WO 2021062839 A1 4/2021

* cited by examiner

*Primary Examiner* — Kashif Siddiqui
(74) *Attorney, Agent, or Firm* — Slater Matsil, LLP

(57) ABSTRACT

A multi-connectivity communication method and an apparatus are provided. The method includes: A terminal device obtains a first rule from a master node; and in response to the terminal device detecting a link problem of the master node, the terminal device determines, according to the first rule, a first secondary node from N secondary nodes configured for the terminal device, where N≥2. The terminal device sends first information to the master node through the first secondary node, where the first information indicates that the terminal device detects the link problem of the master node.

20 Claims, 7 Drawing Sheets

MULTI-CONNECTIVITY COMMUNICATION METHOD AND APPARATUS

CROSS-REFERENCE TO RELATED APPLICATIONS

This application is a continuation of International Application No. PCT/CN2022/099583, filed on Jun. 17, 2022, which claims priority to Chinese Patent Application No. 202110744528.X, filed on Jul. 1, 2021. The disclosures of the aforementioned applications are hereby incorporated by reference in their entireties.

TECHNICAL FIELD

Embodiments of this application relate to the field of wireless communication, and in particular, to a multi-connectivity communication method and an apparatus.

BACKGROUND

In a wireless network, one terminal device may perform communication with a plurality of base stations. When the terminal device performs communication with two base stations, the communication may be referred to as dual-connectivity (DC) or multi-radio dual connectivity (MR-DC). When the terminal device performs communication with more than two base stations, the communication may be referred to as multi-connectivity or multi-radio multi-connectivity (MR-MC). Resources of the plurality of base stations may be used to provide a communication service for the terminal device, to provide high-rate transmission for the terminal device. In the plurality of base stations, a base station that performs control-plane signaling interaction with a core network is referred to as a master node (MN), and another base station is referred to as a secondary node (SN).

Because a plurality of cells of one base station may provide a service for the terminal device, a cell group that is of the MN and that provides a service for the terminal device may also be referred to as a master cell group (MCG). When the terminal device detects a link problem of the MCG, if the terminal device initiates a radio resource control (RRC) reestablishment procedure, data transmission is interrupted. In addition, the RRC reestablishment procedure generally takes a long time. Therefore, time required for data transmission recovery is also long, and communication efficiency is affected.

SUMMARY

Embodiments of this application provide a multi-connectivity communication method and an apparatus, to implement fast MCG link recovery.

According to a first aspect, this application provides a multi-connectivity communication method. The method includes: A terminal device obtains a first rule from a master node. The terminal device may determine, according to the first rule when the terminal device detects a link problem of the master node, a first secondary node from N secondary nodes configured for the terminal device, where N≥2. Further, the terminal device may send first information to the master node through the first secondary node. The first information indicates that the terminal device detects the link problem of the master node.

According to the method, the terminal device determines, according to the first rule indicated by the master node, the first secondary node from the N secondary nodes configured for the terminal device, and sends the first information to the first secondary node. In this case, the first secondary node forwards the first information to the master node. The terminal device may further notify the master node of the link problem of the master node as soon as possible by selecting an appropriate secondary node, so that the master node implements fast MCG link recovery, and the terminal device does not need to initiate an RRC reestablishment procedure for the master node. This improves communication efficiency in a multi-connectivity scenario.

In a possible design, the first rule indicates M secondary nodes in the N secondary nodes, and M≤N.

In a possible design, the first rule includes identifiers of M cells, and there is a correspondence between the M cells and the M secondary nodes. For example, the first rule includes secondary node identifiers respectively corresponding to the M secondary nodes, SCG identifiers respectively corresponding to the M secondary nodes, or PSCell identifiers respectively corresponding to the M secondary nodes.

In a possible design, the terminal device determines, according to the first rule, the first secondary node from the N secondary nodes configured for the terminal device by using the following method: The terminal device determines the first secondary node from the M secondary nodes.

In a possible design, when the terminal device determines the first secondary node from the M secondary nodes, the terminal device may use a secondary node in which no link problem is detected in the M secondary nodes as the first secondary node; or the terminal device may use a secondary node in which no link problem is detected and whose signal quality is higher than a first signal quality threshold in the M secondary nodes as the first secondary node. The first signal quality threshold is preconfigured, or is included in the first rule.

According to the foregoing method and the first rule, the terminal device may determine the first secondary node with reference to a link detection result of the secondary node and signal quality of the secondary node.

In a possible design, when the terminal device determines, according to the first rule, the first secondary node from the N secondary nodes configured for the terminal device, and all the M secondary nodes have a link problem or signal quality of all the M secondary nodes is lower than a second signal quality threshold, the terminal device may determine the first secondary node from a secondary node other than the M secondary nodes in the N secondary nodes.

According to the foregoing method, the terminal device may preferentially determine the first secondary node from the M secondary nodes. The terminal device may determine the first secondary node from the secondary node other than the M secondary nodes in the N secondary nodes when the first secondary node may not be determined from the M secondary nodes.

In a possible design, the first rule indicates a third signal quality threshold. When the terminal device determines, according to the first rule, the first secondary node from the N secondary nodes configured for the terminal device, the terminal device may determine the first secondary node from the N secondary nodes based on the third signal quality threshold. Signal quality of the first secondary node is higher than the third signal quality threshold.

According to the foregoing method, the terminal device may determine the first secondary node based on signal quality respectively corresponding to the N secondary nodes and the third signal quality threshold.

In a possible design, when a status of the terminal device on the first secondary node is a deactivated state, the terminal device triggers switching of the status of the terminal device on the first secondary node from the deactivated state to an activated state.

In a possible design, the terminal device may start a first timer after the terminal device detects the link problem of the master node; and the terminal device may send the first information to a second secondary node if the first timer times out and the terminal device receives no response for the first information from the first secondary node. The second secondary node belongs to the N secondary nodes.

According to the foregoing design, the terminal device sends the first information to the second secondary node, so that a success rate of notifying the master node of the first information can be improved.

In a possible design, the terminal device may receive first indication information from the master node, and the terminal device may send the first information to the second secondary node based on the first indication information. The first indication information indicates a quantity of times that the terminal device is allowed to send the first information, and/or the first indication information indicates that if no response for the first information is received, the terminal device is allowed to select a secondary node other than the first secondary node in the N secondary nodes to send the first information, and/or the first indication information indicates first duration, within which the terminal device is allowed to send the first information.

The foregoing design can ensure that the terminal device sends the first information for a plurality of times, and further improve the success rate of notifying the master node of the first information.

In a possible design, the terminal device determines a third secondary node from the N secondary nodes according to the first rule before the terminal device receives the response for the first information from the first secondary node, and the terminal device sends the first information to the third secondary node.

According to the foregoing design, the terminal device sends the first information to the second secondary node, so that a success rate of notifying the master node of the first information can be improved.

In a possible design, the terminal device may start a second timer after the terminal device detects the link problem of the master node. The terminal device stops the second timer when the terminal device receives a first response. The first response is a response that is received for the first information by the terminal device for the first time. The terminal device recovers communication with the master node based on the first response.

According to the foregoing design, the terminal device may recover communication with the master node based on the response for the first information that is received for the first time, and further implement fast MCG link recovery, improving recovery efficiency, and shortening recovery time.

In a possible design, the terminal device may discard a response for the first information that is received after the first response.

According to the foregoing design, the terminal device may discard, not process, or ignore the response for the first information that is received after the first response.

In a possible design, the method further includes: The terminal device may determine that the master node has the link problem based on one or more of the following. A master cell group radio link failure; a master cell group handover failure; a radio resource control reconfiguration failure; and a radio resource control layer of the terminal device receives indication information indicating an integrity check failure of a signaling radio bearer SRB1 or SRB2.

In a possible design, the first information includes a failure message of a master cell group.

In a possible design, the method further includes: The terminal device receives configuration information from the master node. The configuration information is used to configure fast master cell group link recovery for the terminal device. For example, the configuration information may indicate the duration of the first timer and/or duration of the second timer.

According to a second aspect, this application provides a multi-connectivity communication method. The method includes: A master node may indicate a first rule to a terminal device. The first rule is used to select, when the terminal device detects a link problem of the master node, a first secondary node from N secondary nodes configured for the terminal device. The first secondary node is configured to forward first information received from the terminal device to the master node. The first information indicates that the terminal device detects the link problem of the master node. The master node may receive the first information from the first secondary node, and in response for the first information, the master node sends a response for the first information to the first secondary node.

According to the foregoing method, the master node indicates the first rule to the terminal device, so that the terminal device determines the first secondary node. In this case, the first secondary node forwards the first information to the master node, and the master node sends the response for the first information to the first secondary node. Therefore, the master node can receive a notification about the link problem of the master node as soon as possible by indicating the first rule to the terminal device. The master node can implement fast MCG link recovery based on the notification about the link problem of the master node, and the terminal device does not need to initiate the RRC reestablishment procedure for the master node. This improves communication efficiency in a multi-connectivity scenario.

In a possible design, the first rule indicates M secondary nodes in the N secondary nodes, and $M \leq N$.

In a possible design, the first rule includes identifiers of M cells, and there is a correspondence between the M cells and the M secondary nodes.

In a possible design, the first rule indicates a third signal quality threshold.

In a possible design, the master node may send first indication information to the terminal device. The first indication information indicates a quantity of times that the terminal device is allowed to send the first information, and/or the first indication information indicates that if no response for the first information is received, the terminal device is allowed to select a secondary node other than the first secondary node in the N secondary nodes to send the first information, and/or the first indication information indicates first duration, within which the terminal device is allowed to send the first information.

The foregoing design can ensure that the terminal device sends the first information for a plurality of times, and further improve the success rate of notifying the master node of the first information.

In a possible design, the master node may receive the first information from a second secondary node, and in response for the first information, the master node sends a response for the first information to the second secondary node.

In a possible design, the first information includes a failure message of a master cell group.

In a possible design, the master node sends configuration information to the terminal device. The configuration information is used to configure fast master cell group link recovery for the terminal device.

According to a third aspect, this application provides a communication apparatus. The communication apparatus is a terminal device, or an apparatus configured to implement a function of the terminal device. The apparatus includes a transceiver unit and a processing unit.

The transceiver unit is configured to obtain a first rule from a master node. The processing unit is configured to determine, according to the first rule, a first secondary node from N secondary nodes configured for the terminal device if a link problem of the master node is detected, where N≥2. The transceiver unit is configured to send first information to the master node through the first secondary node. The first information indicates that the terminal device detects the link problem of the master node.

In a possible design, the first rule indicates M secondary nodes in the N secondary nodes, and M≤N.

In a possible design, the first rule includes identifiers of M cells, and there is a correspondence between the M cells and the M secondary nodes.

In a possible design, the processing unit is configured to: when determining, according to the first rule, the first secondary node from the N secondary nodes configured for the terminal device, determine the first secondary node from the M secondary nodes.

In a possible design, the processing unit is configured to: when determining, according to the first rule, the first secondary node from the M secondary nodes, use a secondary node in which no link problem is detected in the M secondary nodes as the first secondary node; or use a secondary node in which no link problem is detected and whose signal quality is higher than a first signal quality threshold in the M secondary nodes as the first secondary node. The first signal quality threshold is preconfigured, or is included in the first rule.

In a possible design, the processing unit is configured to: when determining the first secondary node from the N secondary nodes configured for the terminal device, and all the M secondary nodes have a link problem or signal quality of all the M secondary nodes is lower than a second signal quality threshold, determine the first secondary node from a secondary node other than the M secondary nodes in the N secondary nodes.

In a possible design, the first rule indicates a third signal quality threshold. The processing unit is configured to: when determining, according to the first rule, the first secondary node from the N secondary nodes configured for the terminal device, determine the first secondary node from the N secondary nodes based on the third signal quality threshold. Signal quality of the first secondary node is higher than the third signal quality threshold.

In a possible design, a status of the terminal device on the first secondary node is a deactivated state. The processing unit invokes the transceiver unit to trigger switching of the status of the terminal device on the first secondary node from the deactivated state to an activated state.

In a possible design, the processing unit is configured to start a first timer after the link problem of the master node is detected. The transceiver unit is configured to send the first information to a second secondary node if the first timer times out and the terminal device receives no response for the first information from the first secondary node. The second secondary node belongs to the N secondary nodes.

In a possible design, the transceiver unit is configured to receive first indication information from the master node. The first indication information indicates a quantity of times that the terminal device is allowed to send the first information, and/or the first indication information indicates that if no response for the first information is received, the terminal device is allowed to select a secondary node other than the first secondary node in the N secondary nodes to send the first information, and/or the first indication information indicates first duration, within which the terminal device is allowed to send the first information.

In a possible design, the processing unit is configured to determine a third secondary node from the N secondary nodes according to the first rule before the response for the first information is received from the first secondary node. The transceiver unit is configured to send the first information to the third secondary node.

In a possible design, the processing unit is configured to: start a second timer after the link problem of the master node is detected; stop the second timer when the transceiver unit receives a first response, where the first response is a response for the first information received by the terminal device for the first time; and recover communication with the master node based on the first response by using the transceiver unit.

In a possible design, the processing unit is configured to discard a response for the first information that is received after the first response.

In a possible design, the processing unit is configured to determine that the master node has the link problem based on one or more of the following:

a master cell group radio link failure; a master cell group handover failure; a radio resource control reconfiguration failure; and a radio resource control layer of the terminal device receives indication information indicating an integrity check failure of a signaling radio bearer SRB1 or SRB2.

In a possible design, the first information includes a failure message of a master cell group.

In a possible design, the transceiver unit is configured to receive configuration information from the master node. The configuration information is used to configure fast master cell group link recovery for the terminal device.

According to a fourth aspect, this application provides a communication apparatus. The communication apparatus is a master node device, or an apparatus configured to implement a function of the master node. The apparatus includes a transceiver unit and a processing unit.

The processing unit invokes the transceiver unit to: indicate a first rule to a terminal device, where the first rule is used to select, when the terminal device detects a link problem of the master node, a first secondary node from N secondary nodes configured for the terminal device, the first secondary node is configured to forward first information received from the terminal device to the master node, and the first information indicates that the terminal device detects the link problem of the master node; receive the first information from the first secondary node; and send a response for the first information to the first secondary node.

In a possible design, the first rule indicates M secondary nodes in the N secondary nodes, and M≤N.

In a possible design, the first rule includes identifiers of M cells, and there is a correspondence between the M cells and the M secondary nodes.

In a possible design, the first rule indicates a third signal quality threshold.

In a possible design, the transceiver unit is configured to send first indication information to the terminal device. The first indication information indicates a quantity of times that the terminal device is allowed to send the first information, and/or the first indication information indicates that if no response for the first information is received, the terminal device is allowed to select a secondary node other than the first secondary node in the N secondary nodes to send the first information, and/or the first indication information indicates first duration, within which the terminal device is allowed to send the first information.

In a possible design, the transceiver unit is configured to: receive the first information from a second secondary node, and send the response for the first information to the second secondary node.

In a possible design, the first information includes a failure message of a master cell group.

In a possible design, the transceiver unit is configured to send configuration information to the terminal device. The configuration information is used to configure fast master cell group link recovery for the terminal device.

According to a fifth aspect, this application further provides a communication apparatus. The apparatus may perform the foregoing method design. The apparatus may be a chip or a circuit that can perform a function corresponding to the foregoing method, or a device that includes the chip or the circuit.

In a possible implementation, the apparatus includes: a memory, configured to store computer-executable program code; and a processor, where the processor is coupled to the memory. The program code stored in the memory includes instructions. When the processor executes the instructions, the apparatus or a device in which the apparatus is installed is enabled to perform the method in any one of the foregoing possible designs.

The apparatus may further include a communication interface. The communication interface may be a transceiver. Alternatively, if the apparatus is the chip or the circuit, the communication interface may be an input/output interface of the chip, such as an input/output pin.

In a possible design, the apparatus includes corresponding functional units that are configured to implement the steps in the foregoing method. The function may be implemented by hardware, or by hardware executing corresponding software. The hardware or the software includes one or more units corresponding to the foregoing functions.

According to a sixth aspect, this application provides a computer-readable storage medium, where the computer-readable storage medium stores a computer program. When the computer program runs on an apparatus, the method in any one of the foregoing possible designs is performed.

According to a seventh aspect, this application provides a computer program product, where the computer program product includes a computer program. When the computer program runs on an apparatus, the method in any one of the foregoing possible designs is performed.

According to an eighth aspect, this application provides a communication system. The system includes a communication apparatus configured to implement the third aspect and any possible design of the third aspect, and a communication apparatus configured to implement the fourth aspect and any possible design of the fourth aspect.

DETAILED DESCRIPTION OF THE EMBODIMENTS

The following clearly describes technical solutions in embodiments of this application with reference to the accompanying drawings in embodiments of this application. It is clear that the described embodiments are only some but not all embodiments of this application. In this specification, claims, and accompanying drawings of this application, the terms "first", "second", and the like are intended to distinguish between similar objects but do not necessarily indicate a specific order or sequence. It should be understood that the terms used in such a way are interchangeable in a proper circumstance, and this is only a discrimination manner for describing objects having a same attribute in embodiments of this application. In addition, the terms "include", "contain" and any other variants mean to cover the non-exclusive inclusion, so that a process, method, system, product, or a device that includes a series of units is not necessarily limited to those units, but may include other units not expressly listed or inherent to the process, method, system, product, or a device.

In descriptions of this application, "/" represents "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may exist alone or in plural.

Figure 1:
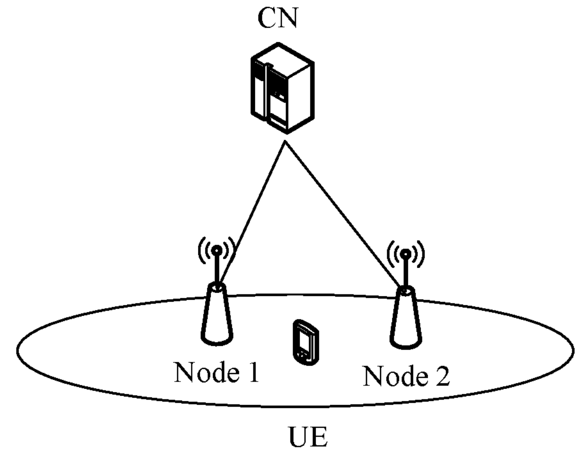
FIG. 1 is a schematic diagram of an architecture of a mobile communication system to which an embodiment of this application is applied.

Embodiments of this application mainly relate to network elements including a terminal, a core network, and an access network device. FIG. 1 is a schematic diagram of an architecture of a mobile communication system to which an embodiment of this application is applied. The mobile communication system includes UE 1, a node 1, a node 2, and a core network (CN).

(1) A terminal is also referred to as user equipment (UE), a mobile station (MS), a mobile terminal (MT), or the like, and is a device that provides voice and/or data connectivity to a user, for example, a handheld device or a vehicle-mounted device that has a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

(2) An access network device is an access network (AN) node (or device) that connects the terminal to a network, and may also be referred to as a base station. For example, an access network design herein may be a wired access network device or a radio access network device. Currently, some examples of the radio access network (RAN) device are as follows: a next generation NodeB (gNB), a transmission-reception point (TRP), an evolved NodeB (eNB), a radio network controller (RNC), a NodeB (NB), a base station controller (BSC), a base transceiver station (BTS), a home base station (like a home evolved NodeB or a home NodeB, HNB), a baseband unit (BBU), a wireless fidelity (Wi-Fi) access point (AP), or the like.

Figure 2:
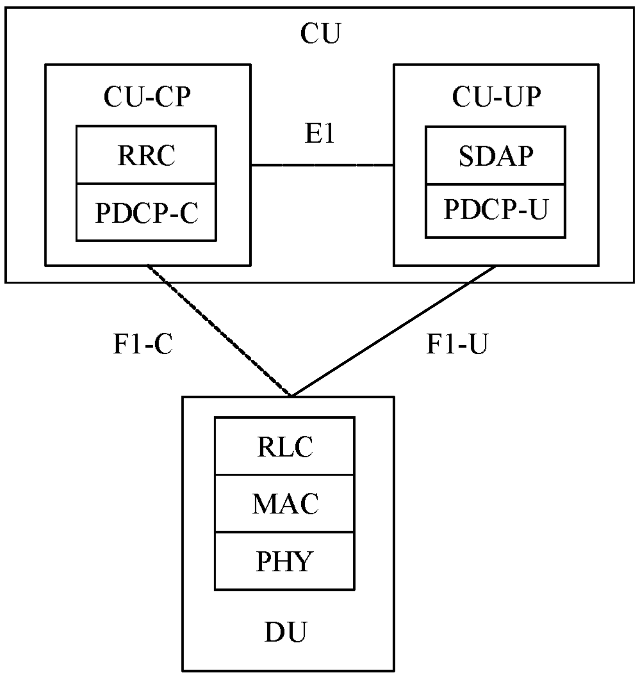
FIG. 2 is a schematic diagram of a structure of an access network device including a CU and a DU according to an embodiment of this application.

In addition, in a network structure, the access network device may include a central unit (CU) node, a distributed unit (DU) node, or a RAN device including the CU node and the DU node. The RAN device including the CU node and the DU node splits protocol layers of the gNB in an NR system. Functions of some protocol layers are all controlled by the CU, and functions of some or all of remaining protocol layers are distributed in the DU, which is controlled by the CU as shown in FIG. 2. Further, the CU may be further divided into a control plane (CU-CP) and a user plane (CU-UP). The CU-CP is responsible for a control plane function, mainly including an RRC, and a packet data convergence protocol (PDCP) corresponding to the control plane (namely, PDCP-C). The PDCP-C is mainly responsible for encryption and decryption, integrity protection, data transmission, and the like of control plane data. The CU-UP is responsible for a user plane function, and mainly includes a service data adaptation protocol (SDAP) and a PDCP corresponding to the user plane (namely, PDCP-U). The SDAP is mainly responsible for processing data of the core network and mapping a flow to a bearer. The PDCP-U is mainly responsible for encryption and decryption, integrity protection, header compression, serial number maintenance, data transmission, and the like of user plane data. The CU-CP is connected to the CU-UP through an E1 interface. The CU-CP represents that the gNB is connected to the core network through an NG interface, and is connected to the DU through an F1 interface control plane (namely, F1-C). The CU-UP is connected to the DU through an F1 interface user plane (namely, F1-U). Certainly, in another possible implementation, the PDCP-C is also included in the CU-UP.

(3) A core network device is a device in the core network that provides service support for the terminal. Currently, some examples of the core network device are as follows: an access and mobility management function (AMF) entity, a session management function (SMF) entity, and a user plane function (UPF) entity, which are not enumerated herein. The AMF entity may be responsible for access management and mobility management of the terminal. The SMF entity may be responsible for session management, such as user session setup. The UPF entity may be a functional entity of the user plane, and is mainly responsible for connecting to an external network. It should be noted that the entity in this application may also be referred to as a network element or a functional entity. For example, the AMF entity may also be referred to as an AMF network element or an AMF functional entity. For another example, the SMF entity may also be referred to as an SMF network element or an SMF functional entity.

The technical solutions provided in embodiments of this application can be applied to various communication systems. For example, the technical solutions can be applicable to a long term evolution (LTE) system or a 5G system, or may be applicable to another new future-oriented system, such as a programmable user plane system. This is not specifically limited in embodiment of this application. In addition, the terms "system" and "network" are interchangeable.

The following briefly describes technical concepts in embodiments of this application.

1. DC or MR-DC

In a wireless network, one terminal device may perform communication with a plurality of base stations, namely, the DC or the MR-DC. The plurality of base stations herein may be base stations that belong to a same radio access technology (RAT) (for example, all are 4G base stations or 5G base stations), or may be base stations of different RATs (for example, one is a 4G base station, and another is a 5G base station).

Each base station has different radio link control (RLC) entities and media access control (MAC) entities. In the DC, data radio bearer (DRB) is classified into an MCG bearer (Bearer), a secondary cell group (SCG) bearer, and a split bearer (split Bearer). The MCG bearer means that an RLC/MAC entity of the DRB is only on a master node. The SCG bearer means that an RLC/MAC entity of the DRB is only on a secondary node. The split bearer means that an RLC/MAC entity of the DRB is on both the master node and the secondary node. A bearer of PDCP terminated at the master node may be referred to as an MN terminated bearer. To be specific, downlink (DL) data directly arrives at the master node from a core network, and after PDCP processing (for example, PDCP processing may be performed after SDAP processing) is performed by the master node, the data is sent to the terminal device via the RLC/MAC. Uplink (UL) data is sent to the core network after PDCP processing (for example, PDCP processing may be performed before SDAP processing) is performed by the master node. Similarly, a bearer of PDCP terminated at the secondary node may be referred to as an SN terminated bearer. To be specific, DL data directly arrives at the secondary node from the core network, and after PDCP processing (for example, PDCP processing may be performed after SDAP processing) is performed by the secondary node, the data is sent to the terminal device via the RLC/MAC. The UL data is sent to the core network after PDCP processing (for example, PDCP processing may be performed before SDAP processing) is performed by the secondary node.

Figure 3:
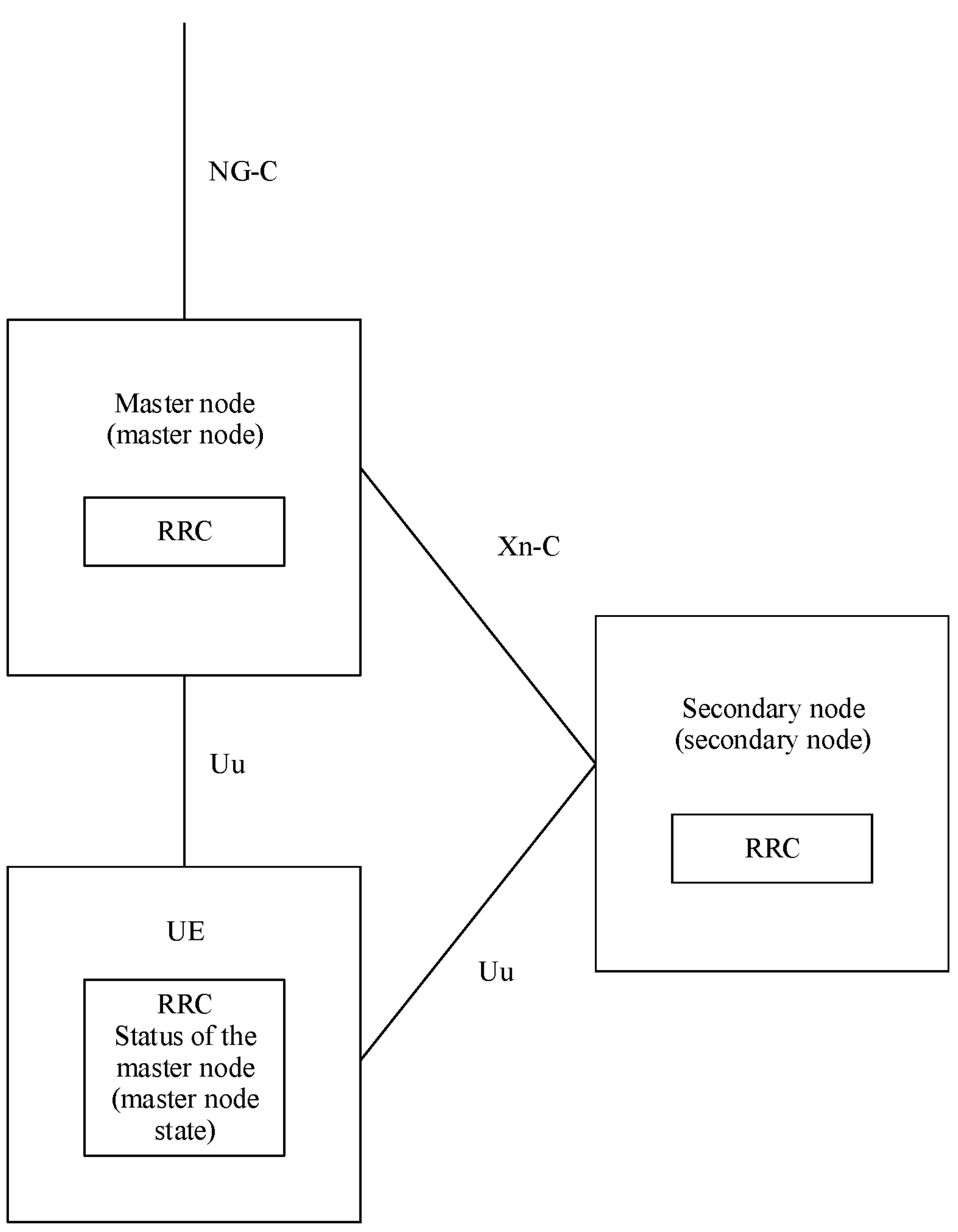
FIG. 3 is a diagram of an architecture of a control plane of MR-DC according to an embodiment of this application.

In addition, in the DC, each of the master node and the secondary node has an RRC entity and may generate an RRC message (namely, a control message, such as a measurement message), as shown in FIG. 3. The secondary node may directly send an RRC message generated by the secondary node to the terminal device. In this case, an RRC message sent by the terminal device to the secondary node is also directly sent to the secondary node. The RRC message directly exchanged between the secondary node and the terminal device are referred to as a signaling radio bearer (SRB) 3. In addition, the RRC message generated by the secondary node may be further notified to the master node, and then the master node sends the RRC message to the terminal device. In this case, the terminal device also forwards the RRC message of the secondary node to the secondary node through the master node. In other words, the terminal device sends the RRC message to the master node, and then the master node forwards the message to the secondary node.

There are different types of MR-DC, for example, dual connectivity between a 4G radio access network connected to a 4G core network and a 5G new radio (NR) (E-UTRA NR-dual connectivity, EN-DC), dual connectivity between the 4G radio access network connected to a 5G core network and the 5G NR (NG-RAN E-UTRA-NR Dual Connectivity, NGEN-DC), dual connectivity between the 5G NR connected to the 5G core network and the 4G radio access network (NR EUTRA-dual connectivity, NE-DC), and dual connectivity between the 5G NR connected to the 5G core network and the 5G NR (NR-NR Dual Connectivity, NR-DC).

Figure 4A:
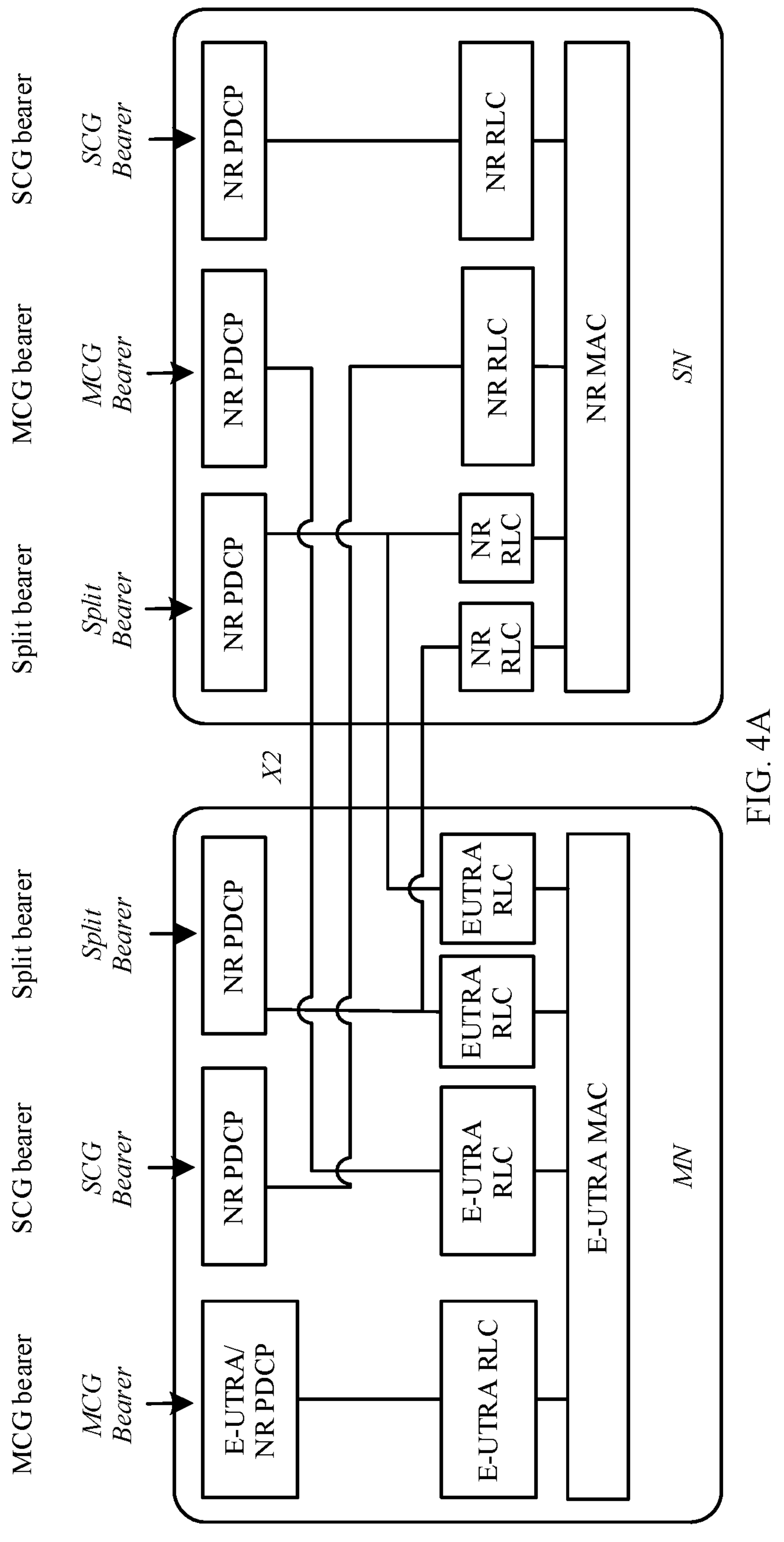
FIG. 4A is a schematic diagram of a protocol stack of an MCG bearer, an SCG bearer, and a split bearer on a network side in EN-DC according to an embodiment of this application.

In the EN-DC, the master node is a long term evolution (LTE) base station connected to the 4G core network (an evolved packet core, EPC) (eNB), and the secondary node is an NR base station. The EN-DC is sometimes referred to as 5G non-standalone (NSA) networking. FIG. 4A is a schematic diagram of protocol stacks of an MCG bearer, an SCG bearer, and a split bearer on a network side in EN-DC.

Figure 4B:
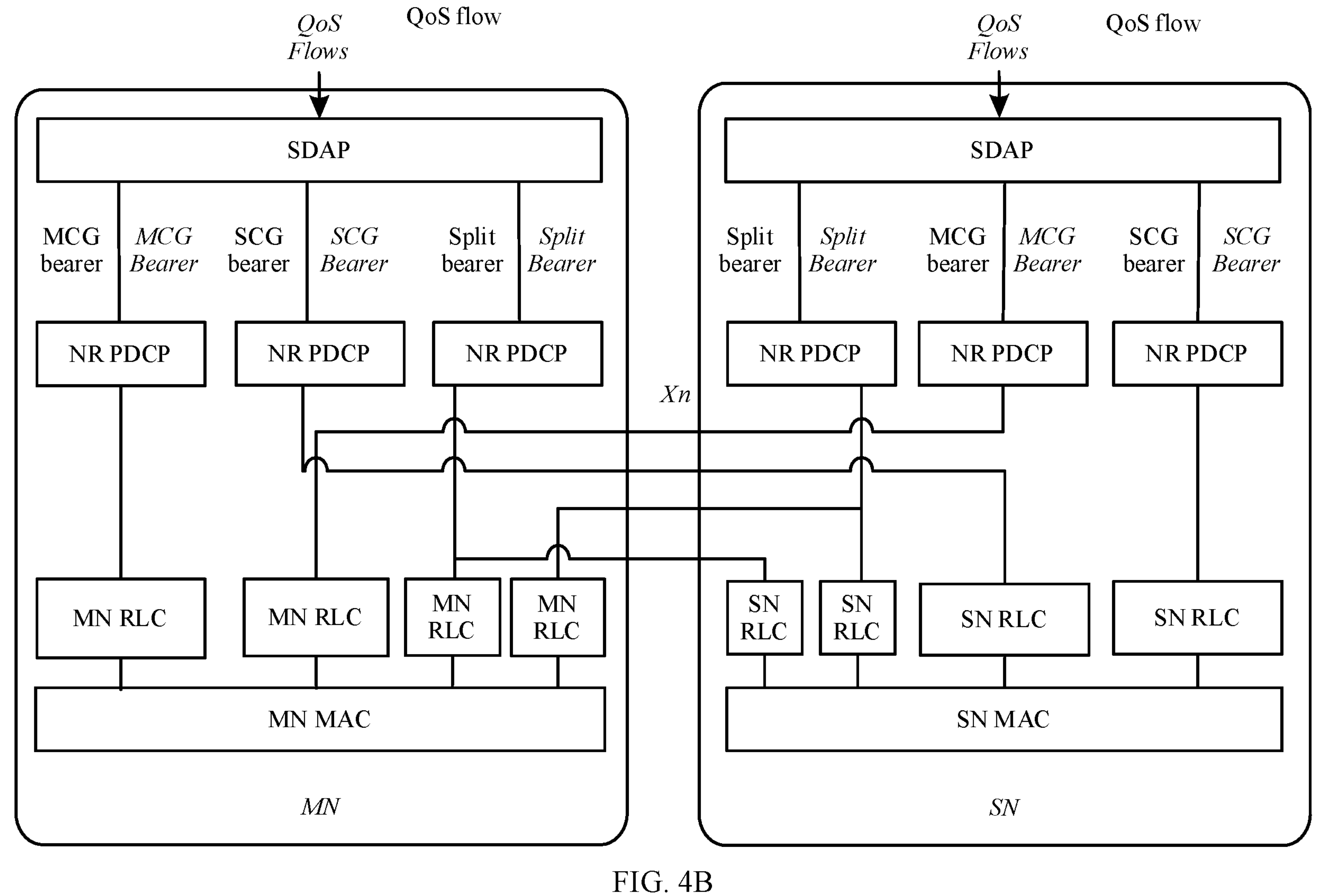
FIG. 4B is a schematic diagram of a protocol stack of an MCG bearer, an SCG bearer, and a split bearer on a network side in NGEN-DC, NE-DC, or NR-DC according to an embodiment of this application.

In the NGEN-DC, the master node is the LTE base station connected to a 5G core (5GC) (ng-eNB), and the secondary node is the NR base station. In the NE-DC, the master node is the NR base station connected to the 5G core network, and the secondary node is the LTE base station. In the NR-DC, the master node is the NR base station connected to the 5G core network, and the secondary node is the NR base station. FIG. 4B is a schematic diagram of protocol stacks of an MCG bearer, an SCG bearer, and a split bearer on a network side in NGEN-DC, NE-DC, or NR-DC.

For one MR-DC terminal device, a user plane of the secondary node may be connected to the core network connected to the master node (that is, the core network may directly send data to UE through the secondary node).

In the MR-DC, there is one primary cell in the master node, and there is one primary secondary cell in the secondary node. The primary cell is a cell that is deployed at a primary frequency and that is indicated as a primary cell by the terminal device when the terminal device initiates an initial connection establishment process, or initiates a connection reestablishment process, or performs a handover process in a cell. The primary secondary cell is a cell in which the terminal device initiates a random access process on the secondary node, or a cell in which the terminal device skips the random access process in a secondary node change process and initiates data transmission, or a cell of the secondary node in which the terminal device initiates the random access when performing reconfiguration with synchronization process.

Because the terminal device may simultaneously receive services of a plurality of cells under one base station, a serving cell group provided by the master node for the terminal device may alternatively be an MCG. Similarly, a serving cell group provided by the secondary node for the terminal device is referred to as an SCG. The MCG and the SCG each include at least one cell. When the MCG includes only one cell, the cell is the primary cell (PCell) of the terminal. When the SCG includes only one cell, the cell is the primary secondary cell (PSCell) of the terminal. To normalize various nouns in the NR, the PCell and PSCell are collectively referred to as a special cell (SpCell). When there are a plurality of cells in the MCG or the SCG, a cell other than the SpCell may be referred to as a secondary cell (SCell). In this case, the SCell and the SpCell in each cell group perform carrier aggregation, to jointly provide a transmission resource for the terminal device.

It should be noted that in this embodiment of this application, one terminal device may perform communication with the plurality of base stations. One base station is the master node, and another base station is the secondary node. For example, the network side may configure N secondary nodes for the terminal device, where $N \geq 2$.

The terminal device has a communication connection with the master node. In some implementations, the terminal device may establish communication connections with the N secondary nodes. Alternatively, the terminal device may establish communication connections with some of the N secondary nodes, and does not establish the communication connections to some of the N secondary nodes.

For example, at a specific moment, the terminal device may trigger switching of a status of the terminal device on one secondary node from a deactivated state to an activated state, that is, only one secondary node is activated. In this case, the status of the terminal device is in the deactivated state on other $N-1$ secondary nodes, that is, the terminal device establishes a communication connection with only one secondary node, and does not establish a communication connection with the other $N-1$ secondary nodes. In addition, the terminal device may further trigger switching of the status on a plurality of secondary nodes in the N secondary nodes from the deactivated state to the activated state, that is, activate the plurality of secondary nodes.

For example, the master node preconfigures related configuration parameters corresponding to the N secondary nodes for the terminal device. A related configuration parameter corresponding to each secondary node is used by the terminal device to establish a communication connection with the secondary node. The master node may notify the terminal device to establish communication connections to one or more of the N secondary nodes. For example, the master node may notify the terminal device to establish a communication connection with one of the N secondary nodes. In this case, the terminal device may perform communication with only the secondary node at a specific moment. Alternatively, the master node may further notify the terminal device to establish communication connections to the plurality of secondary nodes in the N secondary nodes. In this case, the terminal device may simultaneously have communication connections with the plurality of secondary nodes, and the terminal device may perform communication with the plurality of secondary nodes at a specific moment.

In some implementations, the terminal device may simultaneously transmit data on the plurality of base stations, or the terminal device may not simultaneously transmit or send data on the N secondary nodes. For example, the terminal device sends data to or receives data from the N secondary nodes in a time division manner.

The foregoing concepts of some terms in the DC or the MR-DC may be extended to a multi-connectivity scenario.

2. Carrier Aggregation (CA) Technology

The CA specifically means that a plurality of component carriers (cells) are configured for a single terminal device to jointly transmit data.

Primary cell: a cell that operates on a primary component carrier. The terminal device performs the initial connection establishment process or initiates the connection reestablishment process in the cell. The cell is indicated as the primary cell in the handover process.

Primary secondary cell: a cell of the SCG, in which the terminal device is indicated to perform random access or initial physical uplink shared channel (PUSCH) transmission, for example, a random access process is omitted in an SCG change procedure.

Secondary cell: a cell that operates on a secondary component carrier. Once an RRC connection is established, the secondary cell may be configured to provide an additional radio resource.

Serving cell: For the terminal device in an RRC connected (RRC_CONNECTED) state, if the CA or the DC or both are not configured, there is only one serving cell, namely, the PCell; and if the CA or the DC or both are configured, a serving cell set includes the primary cell and the secondary cell. Each component carrier (CC) corresponds to one independent cell. The terminal device configured with the CA and/or DC is connected to one primary cell and a maximum of 31 secondary cells. A primary cell of a specific terminal device and all secondary cells form a serving cell set of the terminal device. The serving cell may indicate the primary cell or the secondary cell.

3. Link Problem of the Master Node (which May Also be Referred to as an MCG Link Problem)

For example, the terminal device may determine that the master node has the link problem based on one or more of the following:

The terminal device detects an MCG RLF (radio link failure), an MCG handover failure; an RRC reconfiguration failure (for example, the terminal device cannot comply with some configurations in a received RRC reconfiguration message); or the RRC of the terminal device receives indication information indicating an integrity check failure of an SRB1 or SRB2 (excluding indication information indicating an integrity check failure of an RRC reestablishment message).

Specifically, a trigger condition of the MCG RLF may include one or more of the following: The terminal device detects that downlink signal quality of the MCG is poor; an RRC layer of the terminal device receives a random access problem indication from MCG MAC; or a data packet of a specific SRB or a DRB that is received from MCG RLC reaches a maximum quantity of retransmissions. For example, the RRC layer of the terminal device receives consecutive N310 out-of-synchronization indications of the PCell from a physical layer, and the terminal device starts one timer T310. If the RRC layer of the terminal device receives no N311 consecutive synchronization indications of the PCell from the physical layer before the T310 times out, the terminal device determines that the downlink signal quality of the MCG is poor.

4. Link Problem of the Secondary Node (which May Also be Referred to as an SCG Link Problem)

For example, the terminal device may determine that the secondary node has the link problem based on one or more of the following:

The terminal device detects that downlink signal quality of the SCG is poor; the RRC layer of the terminal device receives the random access problem indication from an SCG MAC; the terminal device receives, from an SCG RLC, a data packet of a specific SRB or a DRB that reaches the maximum quantity of retransmissions; a handover failure occurs in the SCG (for example, a handover failure occurs in the PSCell); an RRC reconfiguration failure occurs in a message that is sent through SRB3 by the SN (for example, the terminal device cannot comply with some configurations in the RRC reconfiguration message received from the SRB3); or the RRC of the terminal device receives indication information indicating an integrity check failure of the SRB3. For example, the RRC layer of the terminal device receives consecutive N310 out-of-synchronization indications of the PSCell from the physical layer, and the terminal device starts the timer T310. If the RRC layer of the terminal device receives no consecutive N311 synchronization indications of the PSCell from the physical layer before the T310 times out, the terminal device determines that the RLF occurs in the SCG, and determines that the downlink signal quality of the SCG is poor.

5. First Information and a Response for the First Information

The first information indicates that the terminal device detects the link problem of the master node. For example, the first information may include MCG failure information, and the first information may be generated by the RRC corresponding to the master node in the terminal device. For example, the first information may be carried in the RRC message generated by the RRC corresponding to the master node in the terminal device, for example, referred to as an MCG failure information message.

Specifically, the first information may include at least one of the following: a failure type (for example, T310 timeout, a random access failure occurs, or a data packet of the RLC reaches the maximum quantity of retransmissions), measurement results of cells corresponding to some measurement frequencies in some measurement configurations delivered by the master node, measurement results of cells corresponding to some measurement frequencies in some measurement configurations delivered by the secondary node, and the like.

The response for the first information may be carried in the RRC reconfiguration message or an RRC connection release message that is sent by the master node to the terminal device through a first secondary node. For example, the response for the first information may notify the terminal device to change the primary cell or modify some configuration information.

6. Fast MCG Link Recovery (Fast MCG Link Recovery) Mechanism

In the dual connectivity, when the terminal device detects some link problems of the MCG (for details, refer to the foregoing link problem of the master node), if the terminal device initiates an RRC reestablishment procedure, data transmission is interrupted. In addition, time for the RRC reestablishment procedure is usually long. Therefore, time required for data transmission recovery is also long. Specifically, the terminal device selects one cell to perform the RRC reestablishment procedure, the terminal device releases a previous SCG configuration, and data transmission on the secondary node side is interrupted. The data transmission on the secondary node side includes data transmission of the master node terminated bearer or a master node terminated split bearer on the secondary node side, and data transmission of the secondary node terminated bearer or a secondary node terminated split bearer on the secondary node side. Therefore, an SCG configuration needs to be reconfigured for the terminal device subsequently. Time for resuming the bearer in the RRC reestablishment procedure is long. In other words, time for resuming data transmission on the secondary node side is long. In addition, data transmission on the master node side is also interrupted. Specifically, during or after the RRC reestablishment procedure, the master node needs to send the RRC reconfiguration message to the terminal device to reestablish the DRB, and then data can be transmitted between the master node and the terminal device.

A fast MCG link recovery procedure may be used to avoid the foregoing data transmission interruption. Specifically, when the terminal device detects some link problems of the MCG, the terminal device determines whether the SCG detects an SCG RLF. If no SCG RLF is detected, the terminal device may further send the MCG failure information to the master node through the secondary node. In this way, the master node may perform a specific operation (for example, switching or reconfiguring the master node) to recover the MCG. Therefore, the terminal device does not need to initiate the RRC reestablishment procedure. In this case, the SCG configuration may be further reserved, shortening data transmission interruption time on the secondary node side. In addition, the master node may directly include a DRB configuration corresponding to the master node in a response for the MCG failure information. Then, the master node and the terminal device may recover data transmission, shortening data transmission interruption time on the master node side.

Further, in the multi-connectivity case, how the terminal device selects the secondary node from the plurality of secondary nodes for the fast MCG link recovery is a problem to be resolved.

An embodiment of this application provides a multi-connectivity communication method, to implement fast MCG link recovery and improve communication efficiency.

In this embodiment of this application, a master node and N (N≥2) secondary nodes may provide a service for a terminal device, and the N secondary nodes are configured by the master node for the terminal device. The N secondary nodes may include a first secondary node and a second secondary node. The master node may send related configuration parameters corresponding to the N secondary nodes to the terminal device, for example, N pieces of SCG configuration information. Each SCG configuration may include an RLC parameter and/or a MAC parameter. The related configuration parameters of the N secondary nodes may be carried in one message sent by the master node to the terminal device, or may be carried in a plurality of messages sent by the master node to the terminal device.

Figure 5:
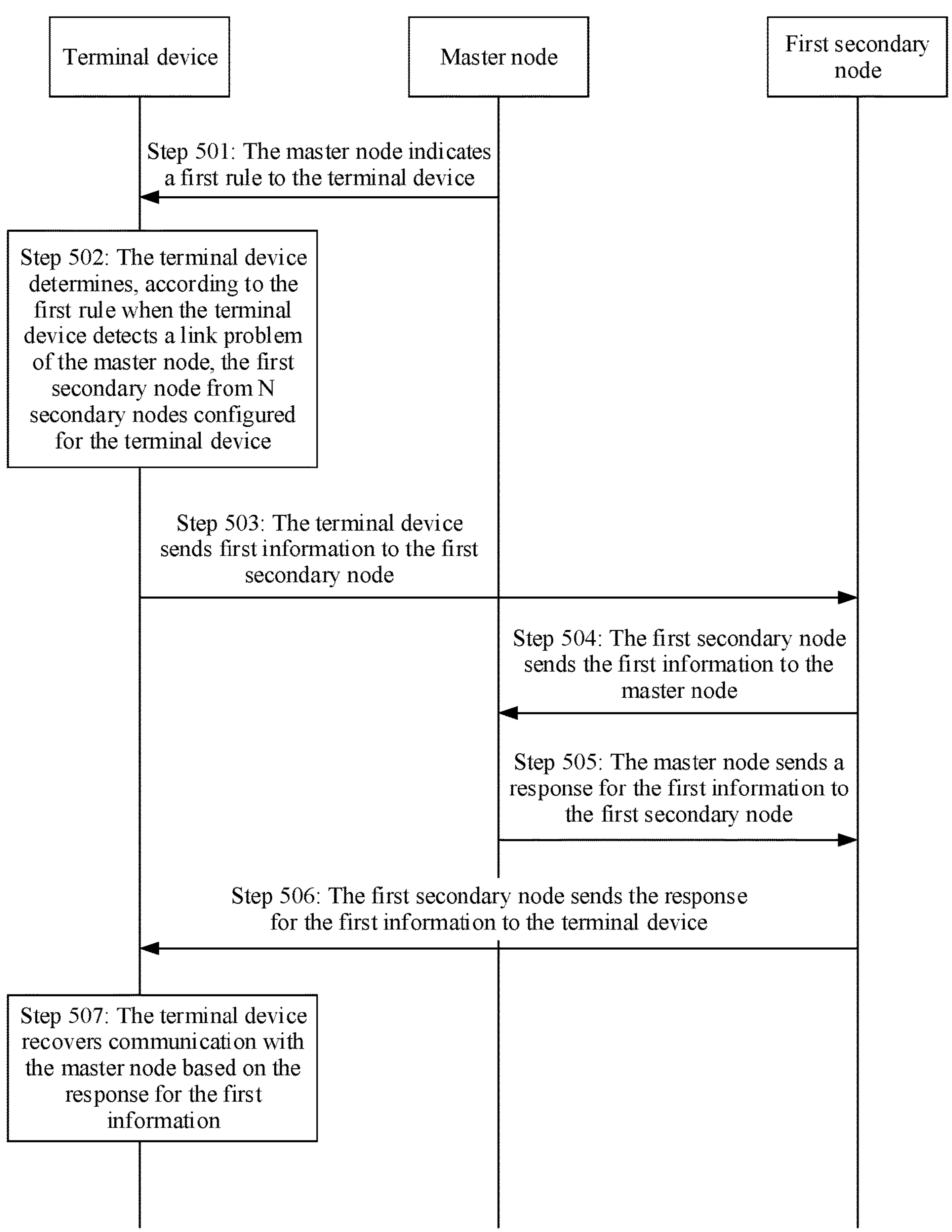
FIG. 5 is a first flowchart of an overview of a multi-connectivity communication method according to an embodiment of this application.

As shown in FIG. 5, the method includes the following steps.

Step 501: A master node indicates a first rule to a terminal device. The first rule is used to select, when the terminal device detects a link problem of the master node, a first secondary node from N secondary nodes configured for the terminal device. The first secondary node is configured to forward first information received from the terminal device to the master node.

For example, the master node notifies the terminal device of the first rule in an explicit indication manner. For example, the master node indicates the first rule to the terminal device. Alternatively, the master node notifies the terminal device of the first rule in an implicit indication manner. For example, the terminal device obtains the first rule according to a predefined rule (for example, content of the first rule is specified in a protocol), if the master node configures the N secondary nodes for the terminal device.

Step 502: The terminal device determines, according to the first rule, the first secondary node from the N secondary nodes configured for the terminal device if the terminal device detects the link problem of the master node, where N≥2.

In another implementation, the master node does not need to indicate the first rule to the terminal device, in other words, step 501 does not need to be performed. The terminal device may determine, according to the predefined rule, the first secondary node from the configured N secondary nodes when the terminal device detects the link problem of the master node.

For the link problem of the master node, refer to the foregoing related content. Details are not repeated.

With reference to several possible implementations of the first rule, the following describes a specific process in which the terminal device determines, according to the first rule, the first secondary node from the N secondary nodes configured for the terminal device.

Manner 1: The First Rule Indicates M Secondary Nodes in the N Secondary Nodes, and M≤N.

For example, the first rule includes identifiers of the M secondary nodes or identifiers of M cells, and there is a correspondence between the M cells and the M secondary nodes. For example, the first rule includes the identifiers of the M secondary nodes, or SCG identifiers respectively corresponding to the M secondary nodes, or PSCell identifiers respectively corresponding to the M secondary nodes.

In an implementation, if the first rule includes an identifier of one secondary node or an identifier of a cell corresponding to one secondary node, and in this case, M=1, the secondary node indicated in the first rule is the first secondary node, and the terminal device may directly determine the first secondary node. In this case, the master node may indicate the first secondary node based on a network side situation. For example, the master node may determine the first secondary node based on a transmission delay between the master node and each secondary node. For example, the master node selects a secondary node with a shortest transmission delay between the master node and each secondary node as the first secondary node. For another example, the master node may determine the first secondary node based on a transmission delay between each secondary node and the terminal device. For example, the master node selects a secondary node with a shortest transmission delay between the master node and the terminal device as the first secondary node. The foregoing solution can ensure that the terminal device can implement fast MCG link recovery most quickly.

In an implementation, if the first rule includes the identifiers of the M secondary nodes, and M>1, the terminal device may determine the first secondary node from the M secondary nodes.

In an example, the terminal device uses a secondary node in which no link problem of the SCG is detected in the M secondary nodes as the first secondary node. For example, the terminal device may first determine whether there is a secondary node with the link problem in the M secondary nodes. If there are one or more secondary nodes with the link problem, the secondary node with the link problem is excluded, and then the first secondary node is determined from the secondary node without the link problem. For example, if the terminal device determines that there are two or more secondary nodes without the link problem, the terminal device may randomly select one secondary node as the first secondary node, or the terminal device may select a secondary node with best signal quality as the first secondary node.

In another example, the terminal device uses a secondary node in which no link problem of the SCG is detected and whose signal quality is higher than a first signal quality threshold in the M secondary nodes as the first secondary node. The first signal quality threshold is preconfigured, or is included in the first rule. For example, if there are two or more secondary nodes whose signal quality is higher than the first signal quality threshold in the secondary nodes without the link problem, the terminal device randomly selects one secondary node as the first secondary node; or the terminal device may select a secondary node with best signal quality as the first secondary node. Therefore, the terminal device screens the secondary nodes based on signal quality, and may use a secondary node with good signal quality as the first secondary node, improving transmission reliability of the first information, and implementing fast MCG link recovery.

In addition, in some implementations, if all the M secondary nodes have the link problem or the signal quality of all the M secondary nodes is lower than a second signal quality threshold, the terminal device determines the first secondary node from a secondary node other than the M secondary nodes in the N secondary nodes. In other words, the terminal device may determine the first secondary node from a secondary node other than the secondary node indicated by the master node, to exclude a secondary node that may fail to receive the first information from the terminal device due to the link problem or poor signal quality. The second signal quality threshold may be the same as or different from the first signal quality threshold. For example, the second signal quality threshold may be less than the first signal quality threshold. In this case, the terminal device may select, from the secondary node other than the M secondary nodes in the N secondary nodes, a secondary node whose signal quality is higher than the first signal quality threshold or the second signal quality threshold as the first secondary node. Alternatively, the terminal device select, from the secondary node other than the M secondary nodes in the N secondary nodes, a secondary node in which no link problem is detected as the first secondary node. Alternatively, the terminal device does not send the first information.

Therefore, the terminal device may preferentially select, based on the M secondary nodes indicated by the first rule, the secondary node used to forward the first information received from the terminal device to the master node. If none of the M secondary nodes is selectable, the terminal device determines the first secondary node from the secondary node other than the M secondary nodes in the N secondary nodes. In this way, an appropriate first secondary node is selected, to improve transmission reliability of the first information, and implement fast MCG link recovery.

Manner 2: The First Rule Indicates a Third Signal Quality Threshold.

The third signal quality threshold may be the same as or different from the first signal quality threshold and the second signal quality threshold. This is not limited in this embodiment of this application.

In an implementation, the terminal device may determine the first secondary node from the N secondary nodes based on the third signal quality threshold. Signal quality of the first secondary node is higher than the third signal quality threshold.

When there are two or more secondary nodes whose signal quality is higher than the third signal quality threshold in the N secondary nodes, the terminal device may select one secondary node with best signal quality as the first secondary node; or the terminal device selects any secondary node from the secondary nodes whose signal quality is higher than the third signal quality threshold as the first secondary node.

Manner 3: The First Rule Indicates the Terminal Device to Preferentially Select a Secondary Node on which the Terminal Device is in an Activated State.

For example, the master node may notify, in an implicit indication manner, the terminal device to preferentially select the secondary node on which the terminal device is in the activated state. For example, if the master node configures the N secondary nodes for the terminal device, the terminal device may obtain the first rule according to the predefined rule. For example, the protocol specifies that the terminal device preferentially selects the secondary node on which the terminal device is in the activated state. Therefore, if the terminal device detects the link problem of the master node, the terminal device preferentially selects the secondary node on which the terminal device is in the activated state. It should be noted that the secondary node in the activated state herein is the secondary node that is in the activated state when the terminal device detects the link problem of the master node. Therefore, when the terminal device detects the link problem of the master node, the terminal device needs to first determine a specific secondary node in the N secondary nodes is the secondary node in the activated state, and preferentially determine the first secondary node from the secondary node in the activated state according to the first rule.

In this embodiment of this application, that the terminal device is in the activated state on one secondary node may be understood as that the terminal device may perform signaling transmission and/or data transmission by using a communication link of an SCG of the secondary node. That the terminal device is in a deactivated state on one secondary node may be understood as that the terminal device suspends signaling transmission and/or data transmission by using the communication link of the SCG of the secondary node, but the terminal device reserves or stores a part or all of an SCG configuration of the secondary node, to fast resume the communication link of the SCG. That the terminal device is in the deactivated state on one secondary node may be further understood as that the master node only configures the secondary node for the terminal device, but the master node does not notify the terminal device to access the secondary node. In this embodiment of this application, the "activated state" may also be referred to as a non-suspended state, a non-sleep state, or an active state. The "deactivated state" may also be referred to as a suspended state, a sleep state, or a deactivated state.

In an example, the terminal device may use the secondary node in the activated state in the N secondary nodes as the first secondary node. For example, the terminal device may first determine whether there is the secondary node in the activated state in the N secondary nodes. The terminal device determines the first secondary node from the secondary node in the activated state if there is the secondary node in the activated state. For example, if the terminal device determines that there are two or more secondary nodes in the activated state, the terminal device may randomly select one secondary node as the first secondary node; or the terminal device may select a secondary node with best signal quality as the first secondary node. If there is no secondary node in the activated state, the terminal device may randomly select one secondary node as the first secondary node; or the terminal device may select the secondary node with best signal quality as the first secondary node.

In another example, the terminal device uses a secondary node in the activated state whose signal quality is higher than a fourth signal quality threshold in the N secondary nodes as the first secondary node. The fourth signal quality threshold is preconfigured, or is included in the first rule. For example, if there are two or more secondary nodes whose signal quality is higher than the fourth signal quality threshold in the secondary nodes in the activated state, the terminal device randomly selects one secondary node as the first secondary node; or the terminal device may select a secondary node with best signal quality as the first secondary node.

In another example, if there is no secondary node in the activated state in the N secondary nodes, the terminal device may randomly select one secondary node as the first secondary node; or the terminal device may select the secondary node with best signal quality as the first secondary node.

Therefore, if the terminal device selects the secondary node, as the first secondary node, on which a status of the terminal device is the deactivated state, the terminal device needs to trigger and activate switching of the status of the terminal device in the first secondary node from the deactivated state to the activated state before sending the first information to the first secondary node. This causes specific signaling overheads. However, if the terminal device selects the secondary node on which the status of the terminal device is the activated state as the first secondary node, the specific signaling overheads can be reduced. In addition, because the specific signaling overheads are reduced, the terminal device can send the first information to the first secondary node as soon as possible. In this way, the appropriate first secondary node is selected, to reduce a transmission delay of the first information, and implement fast MCG link recovery.

It may be understood that the foregoing manner 1, manner 2, and manner 3 may be combined with each other. For example, the first rule indicates the M secondary nodes in the N secondary nodes, and indicates the terminal device to preferentially select the secondary node on which the status of the terminal device is the activated state, that is, the manner 1 and manner 3 are combined. For another example, the first rule indicates the third signal quality threshold, and indicates the terminal device to preferentially select the secondary node on which the status of the terminal device is the activated state, that is, the manner 2 and manner 3 are combined. For another example, the first rule indicates the M secondary nodes in the N secondary nodes, and indicates the third signal quality threshold, that is, the manner 1 and manner 2 are combined.

In addition, when the terminal device determines which secondary node is the first secondary node with reference to the manner 1, manner 2, and manner 3, the terminal device may further consider one or more of the following factors: a transmission delay between the master node and the secondary node, a transmission delay between the secondary node and the terminal device, or the like.

For example, if the terminal device determines that there are two or more secondary nodes without the link problem, the terminal device may select a secondary node from which a transmission delay to the master node is shortest in the secondary nodes without the link problem as the first secondary node; or select a secondary node from which a transmission delay to the terminal device is shortest in the secondary nodes without the link problem as the first secondary node.

For example, if the terminal device determines that there are two or more secondary nodes whose signal quality is higher than the third signal quality threshold, the terminal device may select a secondary node, as the first secondary node, whose signal quality is higher than the third signal quality threshold and from which a transmission delay to the master node is shortest; or select a secondary node, as the first secondary node, whose signal quality is higher than the third signal quality threshold and from which a transmission delay to the terminal device is shortest.

For example, if the terminal device determines that there are two or more secondary nodes in the activated state, the terminal device may select a secondary node from which a transmission delay to the master node is shortest in the secondary nodes in the activated state as the first secondary node; or select a secondary node, as the first secondary node, that is in the secondary nodes in the activated state and from which a transmission delay to the terminal device is shortest.

In addition, it may be understood that the terminal device may further select and determine the first secondary node with reference to another factor. This is not limited in this embodiment of this application.

Step 503: The terminal device sends the first information to the first secondary node.

In some implementations, if the status of the terminal device on the first secondary node is the deactivated state, the terminal device further triggers switching of the status of the terminal device on the first secondary node from the deactivated state to the activated state.

For example, the terminal device may further perform at least one of the following content (a sequence of the following content is not limited herein):

1. The terminal device initiates a random access process to the first secondary node. For example, the terminal device sends a random access channel (RACH) to the first secondary node. Optionally, the terminal device initiates the RACH process to the first secondary node only if an uplink timing alignment timer (for example, timeAlignmentTimer) corresponding to the first secondary node times out.
2. The terminal device recovers data transmission with the first secondary node.

The terminal device may send the first information to the first secondary node in the following manner. For example, the first information may be MCG failure information, or the first information includes the MCG failure information.

In an implementation, the terminal device may send the first information to the first secondary node through a split SRB or an SRB3.

For example, for the split SRB, an RRC entity of the terminal device sends the first information to an RLC entity corresponding to a first secondary node in the split SRB in a form of a PDCP protocol data unit (PDU). Optionally, if the split SRB has RLC entities corresponding to a plurality of secondary nodes, the RRC entity of the terminal device may send the first information to the RLC entities corresponding to all the secondary nodes (including the first secondary node) in the split SRB in the form of the PDCP PDU.

For example, for the SRB3, the terminal device includes the first information in an SRB3 RRC message (for example, a multi-connectivity uplink transmission information message) sent to the first secondary node. The RRC of the terminal device sends, in the form of the PDCP PDU, the SRB3 RRC message sent to the first secondary node to an RLC entity corresponding to the first secondary node in the SRB3.

Step 504: The first secondary node sends the first information to the master node.

For example, the first secondary node sends the first information to the master node by using an interface between the first secondary node and the master node.

In an implementation, if the first secondary node receives the first information through the split SRB, the first secondary node forwards the first information received from the terminal device to the master node (that is, sends the PDCP PDU received from the terminal device to the master node). Therefore, the first secondary node sends the first information to the master node through a user plane connection between the first secondary node and the master node. Optionally, if the split SRB has the RLC entities corresponding to the plurality of secondary nodes, the RRC of the terminal device may send the first information to the RLC entities corresponding to all the secondary nodes (including the first secondary node) in the split SRB in the form of the PDCP PDU. The secondary nodes corresponding to the split SRB, including the first secondary node, send the first information to the master node. In this case, the terminal device sends the first information to all the secondary nodes corresponding to the split SRB, and all the secondary nodes corresponding to the split SRB send the first information to the master node.

In another implementation, if the first secondary node receives the first information through the SRB3, the first secondary node needs to decode the RRC message sent by the terminal device, to obtain the first information in the RRC message. Then, the first secondary node sends the first information to the master node. In this case, the first secondary node sends the first information to the master node through a control plane connection between the first secondary node and the master node.

Step 505: The master node sends a response for the first information to the first secondary node.

In an implementation, if the terminal device sends the first information through the split SRB, the response for the first information may be in the form of the PDCP PDU. The master node sends the response for the first information to the first secondary node through the user plane connection to the first secondary node.

In another implementation, if the terminal device sends the first information through the SRB3, the master node sends the response for the first information to the first secondary node through the control plane connection between the master node and the first secondary node.

Step 506: The first secondary node sends the response for the first information to the terminal device.

In an implementation, if the terminal device sends the first information through the split SRB, the first secondary node sends the PDCP PDU received from the master node to the terminal device.

In another implementation, if the terminal device sends the first information through the SRB3, the first secondary node encapsulates the response for the first information received from the master node into an RRC message (for example, a multi-connectivity downlink transmission information message) corresponding to one SRB3. The first secondary node sends the RRC message corresponding to the SRB3 to the terminal device.

Optionally, in an implementation, the method further includes step 507: The terminal device recovers communication with the master node based on the response for the first information.

For example, the response for the first information may notify the terminal device to hand over a primary cell. The terminal device may be handed over, based on the response for the first information, from an original primary cell to a primary cell determined based on the response for the first information. The primary cell after the handover and the original primary cell may be different cells of a same base station, or different cells of different base stations.

For another example, the response for the first information may notify the terminal device to modify some configuration information. The terminal device may modify the configuration information based on the response for the first information, to recover communication with the original primary cell. For example, new configuration herein may be a maximum quantity of uplink retransmissions. For example, the maximum quantity of uplink retransmissions is increased from 10 to 20.

In addition, in some implementations, the master node may further send the configuration information to the terminal device. The configuration information is used to configure fast master cell group link recovery for the terminal device. For example, the master node may send both the configuration information and the first rule simultaneously to the terminal device. Alternatively, the master node sends the configuration information to the terminal device before the master node sends the first rule to the terminal device. For example, the configuration information is carried in an RRC dedicated message.

Optionally, in some implementations, the terminal device may start a first timer after the terminal device detects the link problem of the master node. For example, the configuration information may indicate duration of the first timer (for example, T316, which may also be referred to as a fast MCG link recovery timer). A function of the first timer is as follows: If the terminal device detects the link problem of the master node, the terminal device generates the first information, starts the first timer, sends the first information, before the first timer times out, receives the response for the first information, and stops the first timer. The following several implementations may be included if the first timer times out and the terminal device receives no response for the first information from the first secondary node.

Manner 1: The terminal device may initiate an RRC reestablishment procedure if the first timer times out and the terminal device receives no response for the first information from the first secondary node.

Manner 2: The terminal device may send the first information to a second secondary node if the first timer times out and the terminal device receives no response for the first information from the first secondary node, where the second secondary node belongs to the N secondary nodes. The second secondary node is different from the first secondary node. For example, the terminal device may determine the second secondary node according to the first rule, or the terminal device may determine the second secondary node based on first indication information. A specific manner for determining the second secondary node is not limited herein. For example, the second secondary node may be a secondary node without the link problem. Manner 2 may be applied to improve a success rate of notifying the master node of the first information.

Optionally, in some implementations, the terminal device may further receive the first indication information from the master node. If the first timer times out and the terminal device receives no response for the first information from the first secondary node, the terminal device sends the first information to the second secondary node based on the first indication information. For example, the first indication information, the configuration information, and the first rule may be sent simultaneously or separately. This is not limited in this embodiment of this application.

For example, the first indication information indicates a quantity of times that the terminal device is allowed to send the first information. For example, the first indication information indicates the quantity of times that the terminal device is allowed to send the first information is K, where K≥2.

Additionally/alternatively, the first indication information indicates that if no response for the first information is received, the terminal device is allowed to select a secondary node other than the first secondary node in the N secondary nodes to send the first information. For example, the first indication information may indicate that if no response for the first information is received, the terminal device is allowed to select a secondary node in an M−1 secondary nodes other than the first secondary node to send the first information. For example, the first indication information may indicate S secondary nodes in the N secondary nodes, and may indicate that if no response for the first information is received, the terminal device is allowed to select a secondary node in the S secondary nodes to send the first information. The S secondary nodes may be completely the same as or completely different from the M secondary nodes, or some of the S secondary nodes are the same as or different from some of the M secondary nodes.

Additionally/alternatively, the first indication information indicates first duration, within which the terminal device is allowed to send the first information. Within the first duration, the terminal device may select to send the first information to the first secondary node again; or the terminal device may select the secondary node other than the first secondary node in the N secondary nodes to send the first information; or the terminal device may select the secondary node other than the first secondary node in the M−1 secondary nodes to send the first information.

In addition, the terminal device generates a message sent to the second secondary node. The terminal device may restart the first timer. The message sent to the second secondary node includes the first information. Optionally, if the first timer times out and the terminal device receives no response for the first information from the second secondary node, the terminal device may initiate the RRC reestablishment procedure or send the first information to a secondary node other than both the first secondary node and the second secondary node in the N secondary nodes.

It should be noted that, in the manner 2, if the terminal device sends the first information to the second secondary node, the terminal device needs to first determine that the first timer times out and the terminal device receives no response for the first information from the first secondary node. In some other embodiments, the terminal device may alternatively send the first information to the secondary node other than the first secondary node if the first timer does not time out and the terminal device receives no response for the first information from the first secondary node. Therefore, the success rate of notifying the master node of the first information may also be improved.

For example, before the terminal device receives the response for the first information from the first secondary node, the terminal device further determines a third secondary node from the N secondary nodes according to the first rule, and sends the first information to the third secondary node. In other words, the terminal device may determine a plurality of secondary nodes from the N secondary nodes according to the first rule. The plurality of secondary nodes include the first secondary node and the third secondary node. The terminal device may send the first information to the plurality of secondary nodes simultaneously, or the terminal device may not send the first information to the plurality of secondary nodes simultaneously. For example, the terminal device may sequentially send the first information based on a preset order of the plurality of secondary nodes, or the terminal device sends the first information to the plurality of secondary nodes based on any order. The preset order of the plurality of secondary nodes herein may be an order of establishing connections between the plurality of secondary nodes and the terminal device, or the master node may configure an order of the plurality of secondary nodes for the terminal device.

The terminal device recovers communication with the master node based on the received response for the first information. It may be understood that because the terminal device sends a plurality of pieces of first information, the terminal device may receive one or more responses for the first information. The plurality of responses for the first information may be the same or may be different.

In an example, the terminal device separately sends the first information to the first secondary node and the third secondary node. The first secondary node forwards the first information to the master node, and receives the response for the first information that is recovered by the master node. The first secondary node sends the received response for the first information to the terminal device. In addition, the third secondary node forwards the first information to the master node, and receives the response for the first information that is recovered by the master node. The third secondary node sends the received response for the first information to the terminal device. In this case, the terminal device may receive the response for the first information from the first secondary node, and receive the response for the first information from the third secondary node. In other words, the terminal device may receive the plurality of responses for the first information. For example, the response for the first information sent by the master node to the first secondary node may be the same as or different from the response for the first information sent by the master node to the third secondary node.

Optionally, the terminal device may start a second timer after the terminal device detects the link problem of the master node. For a specific meaning of the second timer, refer to the specific meaning of the first timer. Repeated content is not described again. Duration of the second timer may be the same as or different from the duration of the first timer. Further, the terminal device stops the second timer when the terminal device receives the first response. The first response is a response for the first information that is received by the terminal device for the first time. The terminal device recovers communication with the master node based on the first response. The terminal device discards, ignores or does not process a response for the first information that is received after the first response. Therefore, if the terminal device first receives the response for the first information from the first secondary node, the terminal device recovers communication with the master node based on the response for the first information, and discards, ignores, or does not process the response for the first information received from the third secondary node. Similarly, if the terminal device first receives the response for the first information from the third secondary node, the terminal device recovers communication with the master node based on the response for the first information, and discards, ignores, or does not process the response for the first information received from the first secondary node.

In another example, the terminal device separately sends the first information to the first secondary node and the third secondary node. The first secondary node forwards the first information to the master node, and the third secondary node forwards the first information to the master node. The master node may send the response for the first information only for the first information received for the first time, and discard, ignore, or do not process the first information received later. Alternatively, if receiving the first information from the first secondary node and receiving the first information from the third secondary node (in other words, receiving the plurality of pieces of first information), the master node selects one secondary node to send the response for the first information. For example, the master node sends the response for the first information only to the first secondary node or the third secondary node. In this case, the terminal device may receive only one response for the first information.

For example, the master node sends the response for the first information to the first secondary node if the master node receives the first information from the first secondary node for the first time. If the master node further receives the first information from the third secondary node after receiving the first information from the first secondary node, the master node discards, ignores or does not process the first information, and does not send the response for the first information to the third secondary node.

According to the embodiment shown in FIG. 5, the terminal device may determine, according to the first rule indicated by the master node, the first secondary node from the N secondary nodes configured for the terminal device, and send the first information to the first secondary node. In this case, the first secondary node forwards the first information to the master node. The terminal device may further notify the master node of the link problem of the master node as soon as possible by selecting an appropriate secondary node, so that the master node implements fast MCG link recovery, and the terminal device does not need to initiate the RRC reestablishment procedure for the master node. This improves communication efficiency in a multi-connectivity scenario.

An embodiment of this application further provides a multi-connectivity communication method, to implement fast MCG link recovery and improve communication efficiency. In the embodiment shown in FIG. 6, when a terminal device detects a link problem of a master node, the terminal device separately sends first information to a plurality of secondary nodes. This can further effectively ensure that the first information is received by the master node. In the embodiment shown in FIG. 6, how the terminal device determines a plurality of secondary nodes from N secondary nodes configured for the terminal device is not limited. The terminal device may separately send the first information to the N secondary nodes; the terminal device may randomly select the plurality of secondary nodes to separately send the first information; or the terminal device selects the plurality of secondary nodes that meet a specific condition. For example, the condition herein may be a first rule or may not be a first rule. It may be understood that the embodiment shown in FIG. 6 further describes the communication method provided in this application based on the embodiment shown in FIG. 5. The embodiment shown in FIG. 6 and the embodiment shown in FIG. 5 may be mutually referenced or combined. Content described in the embodiment shown in FIG. 5 is not described in the embodiment shown in FIG. 6.

The master node and the N secondary nodes may provide a service for the terminal device. The N secondary nodes are configured by a network side for the terminal device, where $N \geq 2$. The N secondary nodes may include a secondary node #A and a secondary node #B. The master node may send configuration information of the N secondary nodes to the terminal device. For example, configuration information of the N secondary nodes may be carried in one message sent by the master node to the terminal device, or may be carried in a plurality of messages sent by the master node to the terminal device.

Figure 6:
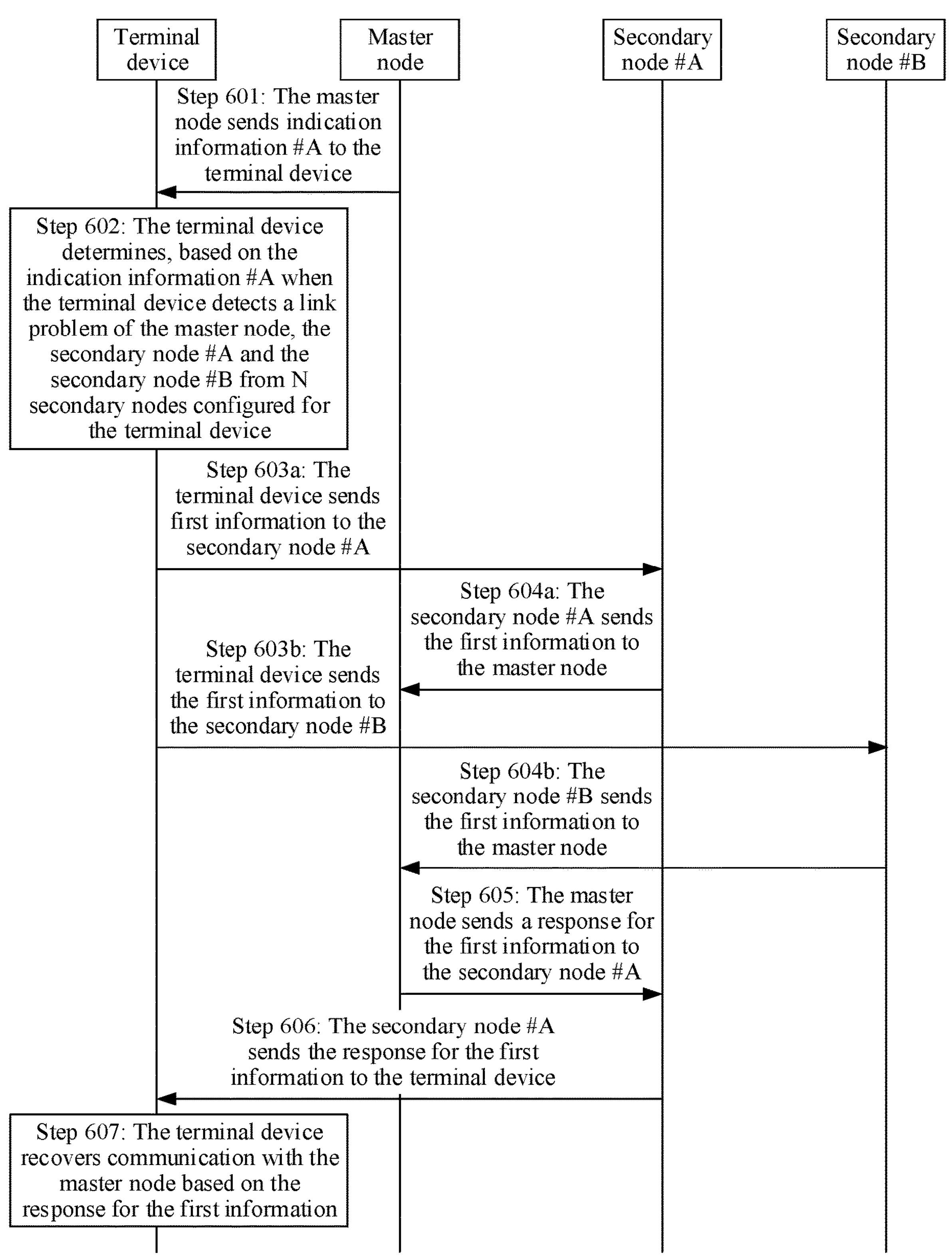
FIG. 6 is a second flowchart of an overview of a multi-connectivity communication method according to an embodiment of this application.

As shown in FIG. 6, the method includes the following steps.

Step 601: The master node sends indication information #A to the terminal device. The indication information #A indicates the terminal device to select the plurality of secondary nodes from the N secondary nodes configured for the terminal device if the terminal device detects the link problem of the master node.

For example, the master node notifies the terminal device of the indication information #A in an explicit indication manner. For example, the master node sends a first information element to the terminal device. The first information element includes one bit. When a value of the first information element is 1, the first information element indicates to allow the terminal device to select the plurality of secondary nodes from the N secondary nodes configured for the terminal device if the terminal device detects the link problem of the master node. When the value of the first information element is 0, the first information element indicates not to allow the terminal device to select the plurality of secondary nodes from the N secondary nodes configured for the terminal device if the terminal device detects the link problem of the master node.

Alternatively, the master node notifies the terminal device of the indication information #A in an implicit indication manner. For example, the terminal device obtains the indication information #A according to a predefined rule (for example, content of the indication information #A is specified in a protocol) if the master node configures the N secondary nodes for the terminal device.

Step 602: The terminal device determines, based on the indication information #A, a secondary node #A and a secondary node #B from the N secondary nodes configured for the terminal device if the terminal device detects the link problem of the master node.

It may be understood that the following uses only an example in which the terminal device determines the secondary node #A and the secondary node #B for description. It may be understood that the terminal device may further determine three or more secondary nodes.

For example, the terminal device may determine Q secondary nodes from the N secondary nodes configured for the terminal device, where $2 \leq Q \leq N$.

It may be understood that a specific manner in which the terminal device determines the plurality of secondary nodes from the N secondary nodes configured for the terminal device is not limited herein. For example, the terminal device selects a plurality of secondary nodes that meet a specific condition, for example, secondary nodes whose signal qualities are better than a specific threshold; or the terminal device selects a plurality of secondary nodes in which no link problem of an SCG is detected; or the terminal device selects a plurality of secondary nodes that are detected to be not in an activated state; or as shown in the embodiment shown in FIG. 5, the master node may further indicate a first rule to the terminal device, and the terminal device may determine the plurality of secondary nodes according to the first rule.

For example, the indication information #A may further indicate a quantity of secondary nodes selected by the terminal device, or another condition. This is not limited in this embodiment of this application.

In some other implementations, the terminal device does not need to obtain the indication information #A from the master node. The terminal device may determine, according to the predefined rule (for example, a specification in the protocol), the secondary node #A and the secondary node #B from the N secondary nodes configured for the terminal device if the terminal device detects the link problem of the master node. In other words, in this implementation, step 601 does not need to be performed. In addition, step 602 may be replaced with the following step: The terminal device determines, according to the predefined rule, the secondary node #A and the secondary node #B from the N secondary nodes configured for the terminal device if the terminal device detects the link problem of the master node.

Step 603*a*: The terminal device sends the first information to the secondary node #A.

Step 603*b*: The terminal device sends the first information to the secondary node #B.

It may be understood that, for a specific meaning of the first information described in this embodiment, reference may be made to the specific meaning of the first information in the embodiment shown in FIG. 5.

For example, the terminal device may separately send the first information to the secondary node #A and the secondary node #B simultaneously, or the terminal device may not separately send the first information to the secondary node #A and the secondary node #B simultaneously. For example, the terminal device may sequentially send the first information based on a preset order of the secondary node #A and the secondary node #B, or the terminal device sends the first information to the secondary node #A and the secondary node #B based on any order. It should be noted that the terminal device does not need to wait for receiving a response for a previous piece of first information before sending a next piece of first information.

If a status of the terminal device on the secondary node #A is a deactivated state, the terminal device further needs to trigger switching of the status of the terminal device on the secondary node #A from the deactivated state to the activated state. Additionally/alternatively, if a status of the terminal device on the secondary node #B is a deactivated state, the terminal device further needs to trigger switching of the status of the terminal device on the secondary node #B from the deactivated state to the activated state.

For a specific implementation in which the terminal device sends the first information to the secondary node #A and the secondary node #B, refer to the foregoing step 503. Repeated content is not described again.

Step 604*a*: The secondary node #A sends the first information to the master node.

Step 604*b*: The secondary node #B sends the first information to the master node.

For a specific implementation in which the secondary node #A sends the first information to the master node and the secondary node #B sends the first information to the master node, refer to the foregoing step 504. Repeated content is not described again.

Step 605: The master node sends a response for the first information to the secondary node #A.

It may be understood that, for a specific meaning of the response for the first information herein, reference may be made to the specific meaning of the response for the first information in the embodiment shown in FIG. 5.

The master node may process the received first information by using, but not limited to, the following manners.

Manner 1: The master node may start processing after receiving the first information for the first time, to generate the response for the first information. The master node discards or ignores the first information received from another secondary node when receiving the first information from the another secondary node again. In this case, the terminal device may receive only one response for the first information.

For example, the master node sends the response for the first information to the secondary node #A if the master node receives the first information from the secondary node #A for the first time. The master node further receives the first information from the secondary node #B after receiving the first information from the secondary node #A, discards, ignores or does not process the first information, and does not send the response for the first information to the secondary node #B.

Manner 2: The master node may send the response for the first information to only one secondary node that sends the first information (for example, a secondary node that earliest receives the first information, or a secondary node that is selected by the master node based on an algorithm of the master node to send the first information). In this case, the terminal device may receive only one response for the first information.

For example, the master node sends the response for the first information only to the secondary node #A or the secondary node #B.

Manner 3: The master node sends the response for the first information for the first information received each time. In this case, the terminal device may receive a plurality of responses for the first information.

For example, the master node may send the response for the first information to the secondary node #A, and send the response for the first information to the secondary node #B. Optionally, the response for the first information sent to the secondary node #A may be the same as or different from the response for the first information sent to the secondary node #B.

It should be noted that step 605 uses only an example in which the master node sends the response for the first information to the secondary node #A, but the master node does not send the response for the first information to the secondary node #B (corresponding to the foregoing manner 1 or manner 2). It may be understood that the master node may further send the response for the first information to the secondary node #B (corresponding to the foregoing manner 3).

Step 606: The secondary node #A sends the response for the first information to the terminal device.

For the foregoing manner 3, the secondary node #B also sends the response for the first information to the terminal device.

For a specific implementation in which the secondary node #A sends the response for the first information to the terminal device and the secondary node #B sends the response for the first information to the terminal device, refer to the foregoing step 506. Repeated content is not described again.

Optionally, in an implementation, the method further includes step 607: The terminal device recovers communication with the master node based on the response for the first information.

For a specific implementation in which the terminal device recovers communication with the master node based on the response for the first information, refer to step 507. Repeated content is not described again.

In addition, in some implementations, the master node may further send the configuration information to the terminal device. The configuration information is used to configure fast master cell group link recovery for the terminal device. For example, the configuration information and the indication information #A may be sent simultaneously or separately. For example, the configuration information is carried in an RRC dedicated message. When the configuration information and the indication information #A may be simultaneously sent, the indication information #A may be included in the configuration information or be excluded from the configuration information.

Optionally, the terminal device may start a third timer after the terminal device detects the link problem of the master node. For a specific meaning of the third timer, refer to the specific meaning of the first timer. Repeated content is not described again. Duration of the third timer may be the same as or different from the duration of the first timer. For example, the configuration information may further indicate the duration of the third timer. Further, the terminal device stops the third timer when the terminal device receives a first response. The first response is a response for the first information that is received by the terminal device for the first time. The terminal device recovers communication with the master node based on the first response. The terminal device discards, ignores or does not process a response for the first information that is received after the first response. For example, corresponding to the foregoing manner 3, if the terminal device first receives the response for the first information from the secondary node #A, the terminal device recovers communication with the master node based on the response for the first information, and discards, ignores, or does not process the response for the first information received from the secondary node #B. Similarly, if the terminal device first receives the response for the first information from the secondary node #B, the terminal device recovers communication with the master node based on the response for the first information, and discards, ignores, or does not process the response for the first information received from the secondary node #A.

According to the embodiment shown in FIG. 6, the terminal device may separately send the first information to the plurality of secondary nodes based on the indication information #A indicated by the master node. This can further improve transmission reliability of the first information, and reduce a transmission delay of the first information, so that the master node implements fast MCG link recovery. In addition, the terminal device does not need to initiate an RRC reestablishment procedure for the master node, improving communication efficiency in a multi-connectivity scenario.

Figure 7:
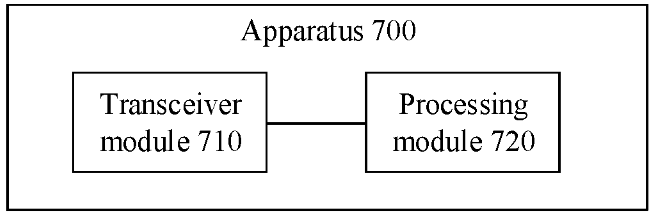
FIG. 7 is a first schematic diagram of a structure of an apparatus according to an embodiment of this application.

FIG. 7 is a possible example block diagram of an apparatus according to an embodiment of this application. The apparatus 700 includes a transceiver module 710 and a processing module 720. The transceiver module 710 may include a receiving unit and a sending unit. The processing module 720 is configured to control and manage an action of the apparatus 700. The transceiver module 710 is configured to support communication between the apparatus 700 and another network entity. Optionally, the apparatus 700 may further include a storage unit, and the storage unit is configured to store program code and data of the apparatus 700.

Optionally, each module in the apparatus 700 may be implemented by software.

Optionally, the processing module 720 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 720 may implement or execute various example logical blocks, modules, and circuits described with reference to content disclosed in this embodiment of this application. Alternatively, the processor may be a combination of processors implementing a computing function, such as a combination of one or more microprocessors, or a combination of the DSP and the microprocessor. The transceiver module 710 may be a communication interface, a transceiver, a transceiver circuit, or the like. The communication interface is a general term. In a specific implementation, the communication interface may include a plurality of interfaces, and the storage unit may be a memory.

When the apparatus 700 is a terminal device or a chip in the terminal device, the processing module 720 in the apparatus 700 may support the apparatus 700 in performing the actions of the terminal device in the foregoing method examples. For example, the processing module 720 may support the apparatus 700 in performing step 502 and step 507 in FIG. 5 and step 602 and step 607 in FIG. 6.

The transceiver module 710 may support communication between the apparatus 700 and a first secondary node. For example, the transceiver module 710 may support the apparatus 700 in performing step 501, step 503, and step 506 in FIG. 5, and step 601, step 603*a*, step 603*b*, and step 606 in FIG. 6.

For example, details may be as follows.

In an implementation, the apparatus 700 includes the following two modules.

The transceiver module 710 is configured to obtain a first rule from a master node; and the processing module 720 is configured to determine, according to the first rule, the first secondary node from N secondary nodes configured for the terminal device if a link problem of the master node is detected, where N≥2. The transceiver module 710 is configured to send first information to the master node through the first secondary node. The first information indicates that the terminal device detects the link problem of the master node.

It should be understood that the apparatus 700 according to this embodiment of this application may be corresponding to the terminal device in the foregoing method embodiment. In addition, operations and/or functions of the modules in the apparatus 700 are separately intended to implement corresponding steps of the method for the terminal device in the foregoing method embodiment. Therefore, the apparatus 700 can also implement beneficial effect in the foregoing method embodiment. For brevity, details are not described herein.

When the apparatus 700 is the master node or a chip in the master node, the processing module 720 in the apparatus 700 may support the apparatus 700 in performing actions of the master node in the foregoing method examples.

The transceiver module 710 may support communication between the apparatus 700 and the terminal device, the first secondary node, or a second secondary node. For example, the transceiver module 710 may support the apparatus 700 in performing step 501, step 504, and step 505 in FIG. 5, and step 601, step 604*a*, step 604*b*, step 605, and step 606 in FIG. 6.

For example, details may be as follows.

In an implementation, the processing module 720 invokes the transceiver module 710 to:

indicate the first rule to the terminal device, where the first rule is used to select the first secondary node from the N secondary nodes configured for the terminal device if the terminal device detects the link problem of the master node, the first secondary node is configured to forward the first information received from the terminal device to the master node, and the first information indicates that the terminal device detects the link problem of the master node; receive the first information from the first secondary node; and send a response for the first information to the first secondary node.

It should be understood that the apparatus 700 according to this embodiment of this application may be corresponding to the method for the master node in the foregoing method embodiment. In addition, the operations and/or functions of the modules in the apparatus 700 are separately intended to implement corresponding steps of the method for the master node in the foregoing method embodiment. Therefore, the apparatus 700 can also implement the beneficial effect in the foregoing method embodiment. For brevity, details are not described herein.

Figure 8:
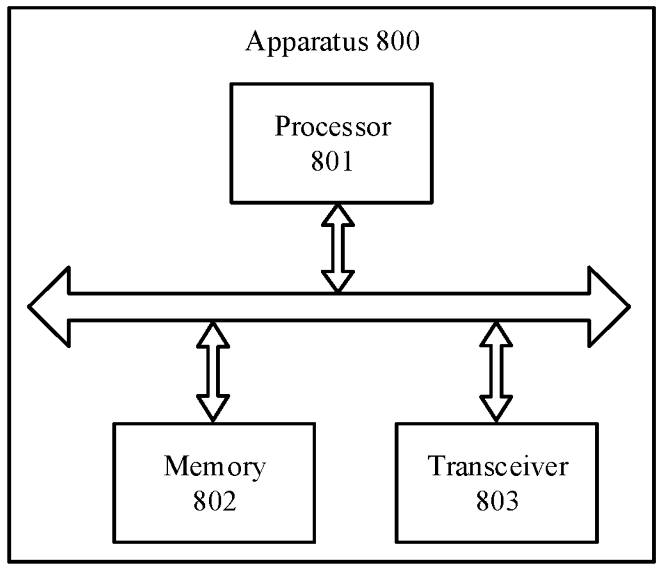
FIG. 8 is a second schematic diagram of a structure of an apparatus according to an embodiment of this application.

FIG. 8 is a schematic diagram of a structure of a communication apparatus 800 according to an embodiment of this application. As shown in FIG. 8, the apparatus 800 includes a processor 801.

When the apparatus 800 is a terminal device or a chip in the terminal device, in a possible implementation, the processor 801 is configured to invoke an interface to perform the following actions:

obtaining a first rule from a master node; determining, according to the first rule, a first secondary node from N secondary nodes configured for the terminal device if a link problem of the master node is detected, where N≥2; and sending first information to the master node through the first secondary node, where the first information indicates that the terminal device detects the link problem of the master node.

It should be understood that the apparatus 800 may be further configured to perform another step and/or operation on a terminal device side in the foregoing embodiments. For brevity, details are not described herein.

When the apparatus 800 is the master node or a chip in the master node, in a possible implementation, the processor 801 is configured to invoke the interface to perform the following actions:

indicating the first rule to the terminal device, where the first rule is used to select the first secondary node from the N secondary nodes configured for the terminal device if the terminal device detects the link problem of the master node, the first secondary node is configured to forward the first information received from the terminal device to the master node, and the first information indicates that the terminal device detects the link problem of the master node; receiving the first information from the first secondary node; and sending a response for the first information to the first secondary node.

It should be understood that the apparatus 800 may be further configured to perform other another step and/or operation on a master node side in the foregoing embodiments. For brevity, details are not described herein.

It should be understood that the processor 801 may invoke the interface to perform the foregoing receiving and sending actions. The invoked interface may be a logical interface or a physical interface. This is not limited. Optionally, the physical interface may be implemented by using a transceiver. Optionally, the apparatus 800 further includes a transceiver 803.

Optionally, the apparatus 800 further includes a memory 802. The memory 802 may store the program code in the foregoing method embodiment, so that the processor 801 invokes the program code.

Specifically, if the apparatus 800 includes the processor 801, the memory 802, and the transceiver 803, the processor 801, the memory 802, and the transceiver 803 communicate with each other through an inner connection path, to transmit a control signal and/or a data signal. In a possible design, the processor 804 the memory 802, and the transceiver 803 may be implemented by using a chip. The processor 801, the memory 802, and the transceiver 803 may be implemented in a same chip, or may be separately implemented in different chips, or functions of any two of the processor 801, the memory 802, and the transceiver 803 are implemented in one chip. The memory 802 may store the program code, and the processor 801 invokes the program code stored in the memory 802, to implement a corresponding function of the apparatus 800.

The methods disclosed in this embodiment of this application may be applied to the processor or may be implemented by the processor. The processor may be an integrated circuit chip with a signal processing capability. In an implementation process, the steps of the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, a discrete hardware component, or may be a system on chip (SoC), a central processing unit (CPU), a network processor (NP), a digital signal processor (DSP), a microcontroller unit (MCU), a programmable logic device (PLD), or another integrated chip. The processor may implement or perform the methods, steps, and logical block diagrams that are disclosed in embodiments of this application. The general-purpose processor may be the microprocessor, or the processor may be any conventional processor or the like. The steps in the methods disclosed with reference to embodiments of this application may be directly performed and completed by a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Based on description used as an example instead of a limitation, a plurality forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and methods described in this specification includes but is not limited to these memories and any memory of another appropriate type.

It should be understood that in embodiments of this application, the numbers "first", "second", and the like are only used to distinguish between different objects, for example, to distinguish between different parameter information or messages, and do not constitute a limitation on the scope of embodiments of this application. Embodiments of this application are not limited thereto.

It should be further understood that sequence numbers of the foregoing processes do not mean execution sequences in embodiments of this application. The execution sequences of the processes should be determined based on functions and internal logic of the processes. Numbers or the sequence numbers in the foregoing processes are only for differentiation for ease of description, and shall not constitute any limitation on an implementation process of embodiments of this application.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing description, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described function for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, division into units is only a logical function division, and another division manner may be used in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units are integrated into one unit.

When the function is implemented in a form of a software functional unit and sold or used as a separate product, the function may be stored in a computer-readable storage medium. Based on such an understanding, the technical solutions of this application essentially or parts contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-connectivity communication method, applied to a terminal device and comprising:

obtaining a first rule from a master node;

determining, according to the first rule in response to the terminal device detecting a link problem of the master node, a first secondary node from N secondary nodes configured for the terminal device, wherein N≥2;

sending first information to the master node through the first secondary node, wherein the first information indicates that the terminal device has detected the link problem of the master node;

determining, according to the first rule, a third secondary node from the N secondary nodes before the terminal device receives a first response for the first information from the first secondary node for a first time;

sending the first information to the third secondary node;

starting a second timer after the terminal device detects the link problem of the master node;

stopping the second timer in response to the terminal device receiving the first response;

recovering communication with the master node based on the first response; and discarding a further response for the first information that is received after the first response.

2. The method according to claim 1, wherein:

the first rule indicates M secondary nodes in the N secondary nodes, where M≤N; and determining, according to the first rule, the first secondary node from the N secondary nodes configured for the terminal device comprises determining the first secondary node from the M secondary nodes.

3. The method according to claim 2, wherein determining the first secondary node from the M secondary nodes comprises:

using a secondary node in which no link problem is detected in the M secondary nodes as the first secondary node; or using a secondary node in which no link problem is detected and whose signal quality is higher than a first signal quality threshold in the M secondary nodes as the first secondary node, wherein the first signal quality threshold is preconfigured, or the first signal quality threshold is comprised in the first rule; or determining the first secondary node from a secondary node other than the M secondary nodes in the N secondary nodes in response to all the M secondary nodes having a link problem or in response to a signal quality of all of the M secondary nodes being lower than a second signal quality threshold.

4. The method according to claim 1, wherein:

the first rule indicates a third signal quality threshold; and determining, according to the first rule, the first secondary node from the N secondary nodes configured for the terminal device comprises:

determining, based on the third signal quality threshold, the first secondary node from the N secondary nodes, wherein a signal quality of the first secondary node is higher than the third signal quality threshold.

5. The method according to claim 1, wherein:

a status of the terminal device on the first secondary node is a deactivated state; and the method further comprises triggering switching of the status of the terminal device on the first secondary node from the deactivated state to an activated state.

6. The method according to claim 1, further comprising receiving first indication information from the master node, wherein:

the first indication information indicates a quantity of times that the terminal device is allowed to send the first information; or the first indication information indicates that if no response for the first information is received, the terminal device is allowed to select a secondary node other than the first secondary node in the N secondary nodes to send the first information;

or the first indication information indicates a first duration within which the terminal device is allowed to send the first information.

7. A data transmission apparatus comprising:

one or more processors; and a memory with instructions stored thereon, wherein the instructions, when executed by the one or more processors, enable the apparatus to perform:

obtaining a first rule from a master node, determining, according to the first rule in response to the apparatus detecting a link problem of the master node, a first secondary node from N secondary nodes configured for the apparatus, wherein N≥2;

sending first information to the master node through the first secondary node, wherein the first information indicates that the apparatus has detected the link problem of the master node;

determining, according to the first rule, a third secondary node from the N secondary nodes before a first response for the first information is received from the first secondary node for a first time;

sending the first information to the third secondary node;

starting a second timer after the apparatus detects the link problem of the master node;

stopping the second timer in response to the apparatus receiving the first response;

recovering communication with the master node based on the first response; and discarding a further response for the first information that is received after the first response.

8. The apparatus according to claim 7, wherein:

the first rule indicates M secondary nodes in the N secondary nodes, where M≤N, determining, according to the first rule, the first secondary node from the N secondary nodes configured for the apparatus comprises determining the first secondary node from the M secondary nodes.

9. The apparatus according to claim 8, wherein determining the first secondary node from the M secondary nodes comprises:

using a secondary node in which no link problem is detected in the M secondary nodes as the first secondary node; or using a secondary node in which no link problem is detected and whose signal quality is higher than a first signal quality threshold in the M secondary nodes as the first secondary node, wherein the first signal quality threshold is preconfigured, or the first signal quality threshold is comprised in the first rule; or determining the first secondary node from a secondary node other than the M secondary nodes in the N secondary nodes in response to all the M secondary nodes having a link problem or in response to a signal quality of all of the M secondary nodes being lower than a second signal quality threshold.

10. The apparatus according to claim 7, wherein:

the first rule indicates a third signal quality threshold; and determining, according to the first rule, the first secondary node from the N secondary nodes configured for the apparatus comprises:

determining, based on the third signal quality threshold, the first secondary node from the N secondary nodes, wherein signal a quality of the first secondary node is higher than the third signal quality threshold.

11. The apparatus according to claim 7, wherein:

a status of the apparatus on the first secondary node is a deactivated state; and the instructions, when executed by the one or more processors, further enable the apparatus to perform:

triggering switching of the status of the apparatus on the first secondary node from the deactivated state to an activated state.

12. The apparatus according to claim 7, wherein the instructions, when executed by the one or more processors, further enable the apparatus to receive first indication information from the master node, wherein:

the first indication information indicates a quantity of times that the apparatus is allowed to send the first information; or the first indication information indicates that if no response for the first information is received, the apparatus is allowed to select a secondary node other than the first secondary node in the N secondary nodes to send the first information; or the first indication information indicates a first duration, within which the apparatus is allowed to send the first information.

13. A non-transitory computer readable medium storing instructions that are executable by a processor, wherein the non-transitory computer readable medium is applied to a first communication apparatus, and the instructions, when executed, enable the first communication apparatus to perform:

obtaining a first rule from a master node;

determining, according to the first rule in response to the first communication apparatus detecting a link problem of the master node, a first secondary node from N secondary nodes configured for the first communication apparatus, wherein N≥2;

sending first information to the master node through the first secondary node, wherein the first information indicates that the first communication apparatus has detected the link problem of the master node;

determining, according to the first rule, a third secondary node from the N secondary nodes before the first communication apparatus receives a first response for the first information from the first secondary node for a first time;

sending the first information to the third secondary node;

starting a second timer after the first communication apparatus detects the link problem of the master node;

stopping the second timer in response to the first communication apparatus receiving the first response;

recovering communication with the master node based on the first response; and discarding a further response for the first information that is received after the first response.

14. The non-transitory computer readable medium according to claim 13, wherein:

the first rule indicates M secondary nodes in the N secondary nodes, where M≤N; and determining, according to the first rule, the first secondary node from the N secondary nodes configured for the first communication apparatus comprises determining the first secondary node from the M secondary nodes.

15. The non-transitory computer readable medium according to claim 14, wherein the determining the first secondary node from the M secondary nodes comprises:

using a secondary node in which no link problem is detected in the M secondary nodes as the first secondary node; or using a secondary node in which no link problem is detected and whose signal quality is higher than a first signal quality threshold in the M secondary nodes as the first secondary node, wherein the first signal quality threshold is preconfigured, or the first signal quality threshold is comprised in the first rule; or determining the first secondary node from a secondary node other than the M secondary nodes in the N secondary nodes in response to all the M secondary nodes having a link problem or in response to a signal quality of all of the M secondary nodes being lower than a second signal quality threshold.

16. The non-transitory computer readable medium according to claim 13, wherein the first rule indicates a third signal quality threshold; and determining, according to the first rule, the first secondary node from the N secondary nodes configured for the first communication apparatus comprises:

determining, based on the third signal quality threshold, the first secondary node from the N secondary nodes, wherein a signal quality of the first secondary node is higher than the third signal quality threshold.

17. The non-transitory computer readable medium according to claim 13, wherein:

a status of the first communication apparatus on the first secondary node is a deactivated state; and the instructions, when executed, further enable the first communication apparatus to perform triggering switching of the status of the first communication apparatus on the first secondary node from the deactivated state to an activated state.

18. The non-transitory computer readable medium according to claim 13, wherein the instructions, when executed, further enable the first communication apparatus to perform receiving first indication information from the master node, wherein:

the first indication information indicates a quantity of times that the first communication apparatus is allowed to send the first information; or the first indication information indicates that if no response for the first information is received, the first communication apparatus is allowed to select a secondary node other than the first secondary node in the N secondary nodes to send the first information; or the first indication information indicates a first duration, within which the first communication apparatus is allowed to send the first information.

19. The method according to claim 1, wherein:

the terminal device sends the first information to the first secondary node and the third secondary node simultaneously; or the terminal device sequentially sends the first information to the first secondary node and the third secondary node based on a preset order.

20. The method according to claim 1, wherein the first response is received from one of the first secondary node or the third secondary node.

* * * * *